(12) United States Patent
Kato et al.

(10) Patent No.: US 7,460,630 B2
(45) Date of Patent: Dec. 2, 2008

(54) DEVICE AND METHOD FOR SYNCHRONOUS DATA TRANSMISSION USING REFERENCE SIGNAL

(75) Inventors: Shinya Kato, Kawasaki (JP); Takayoshi Kyono, Yokohama (JP); Ryuichi Nisiyama, Kawasaki (JP); Jin Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 466 days.

(21) Appl. No.: 11/057,146

(22) Filed: Feb. 15, 2005

(65) Prior Publication Data

US 2006/0023825 A1 Feb. 2, 2006

(30) Foreign Application Priority Data

Aug. 2, 2004 (JP) .............................. 2004-225976

(51) Int. Cl.
*H04L 7/027* (2006.01)
(52) U.S. Cl. ....................... 375/372; 375/295; 375/316; 375/340
(58) Field of Classification Search .................. 375/372
See application file for complete search history.

(56) References Cited

U.S. PATENT DOCUMENTS

| 5,568,526 | A | 10/1996 | Ferraiolo et al. | |
|---|---|---|---|---|
| 5,832,047 | A | 11/1998 | Ferraiolo et al. | |
| 6,026,498 | A | 2/2000 | Fuse et al. | |
| 6,658,581 | B1 | 12/2003 | Takahashi et al. | |
| 6,680,636 | B1 * | 1/2004 | Parry et al. ............... | 327/161 |
| 6,704,890 | B1 * | 3/2004 | Carotti et al. ............. | 714/700 |
| 2002/0009169 | A1 | 1/2002 | Watanabe | |
| 2006/0092969 | A1 * | 5/2006 | Susnow et al. ............ | 370/465 |

FOREIGN PATENT DOCUMENTS

| EP | 0 605 751 | 7/1994 |
|---|---|---|
| JP | 5-225079 | 9/1993 |
| JP | 5-336091 | 12/1993 |
| JP | 5-336210 | 12/1993 |
| JP | 6-177940 | 6/1994 |
| JP | 8-44667 | 2/1996 |
| JP | 8-54955 | 2/1996 |
| JP | 8-102729 | 4/1996 |
| JP | 10-164037 | 6/1998 |
| JP | 11-163846 | 6/1999 |
| JP | 2000-134189 | 5/2000 |

(Continued)

*Primary Examiner*—Shuwang Liu
*Assistant Examiner*—David Huang
(74) *Attorney, Agent, or Firm*—Staas & Halsey LLP

(57) ABSTRACT

A data transmitter and a data receiver generate respective synchronous signals from a common reference signal. The data receiver adjusts a phase of a first clock signal using each one of one-bit data signals each consisting of a single bit of received parallel data, so that a setup time and a hold time are ensured for the each one-bit data signal, and loads each one-bit data signal into a data buffer in accordance with the adjusted clock signal. Then, the data receiver reads the data held in the data buffer, in accordance with a second clock signal and in synchronization with the receiver synchronous signal. A memory position where the data signal is to be loaded is initialized when a training pattern transmitted in synchronization with the transmitter synchronous signal is detected.

18 Claims, 29 Drawing Sheets

FOREIGN PATENT DOCUMENTS

| | | |
|---|---|---|
| JP | 2000-285144 | 10/2000 |
| JP | 2000-341135 | 12/2000 |
| JP | 2002-44061 | 2/2002 |
| JP | 2002-108642 | 4/2002 |
| JP | 2002-223208 | 8/2002 |
| JP | 2003-273852 | 9/2003 |

* cited by examiner

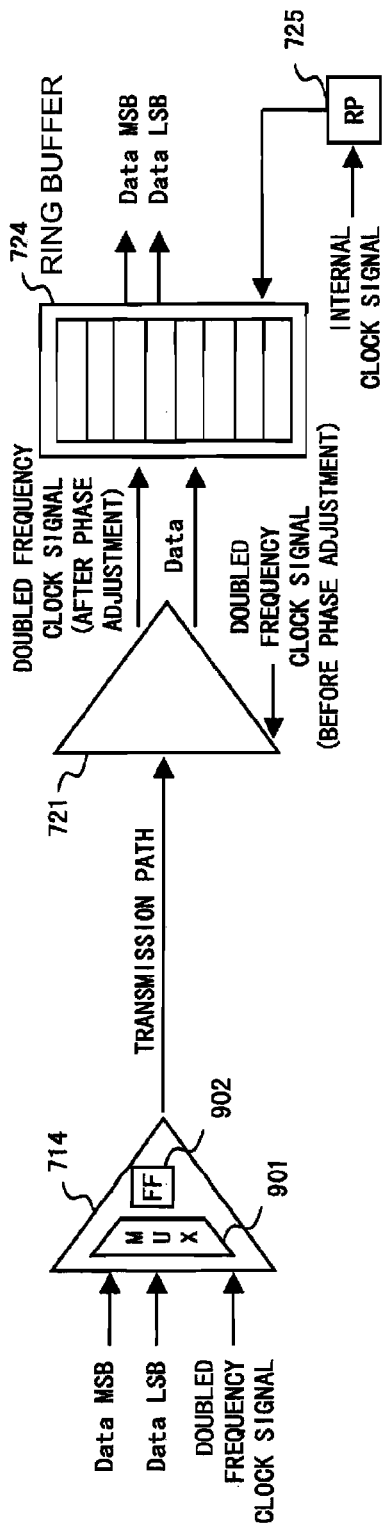
F I G. 9

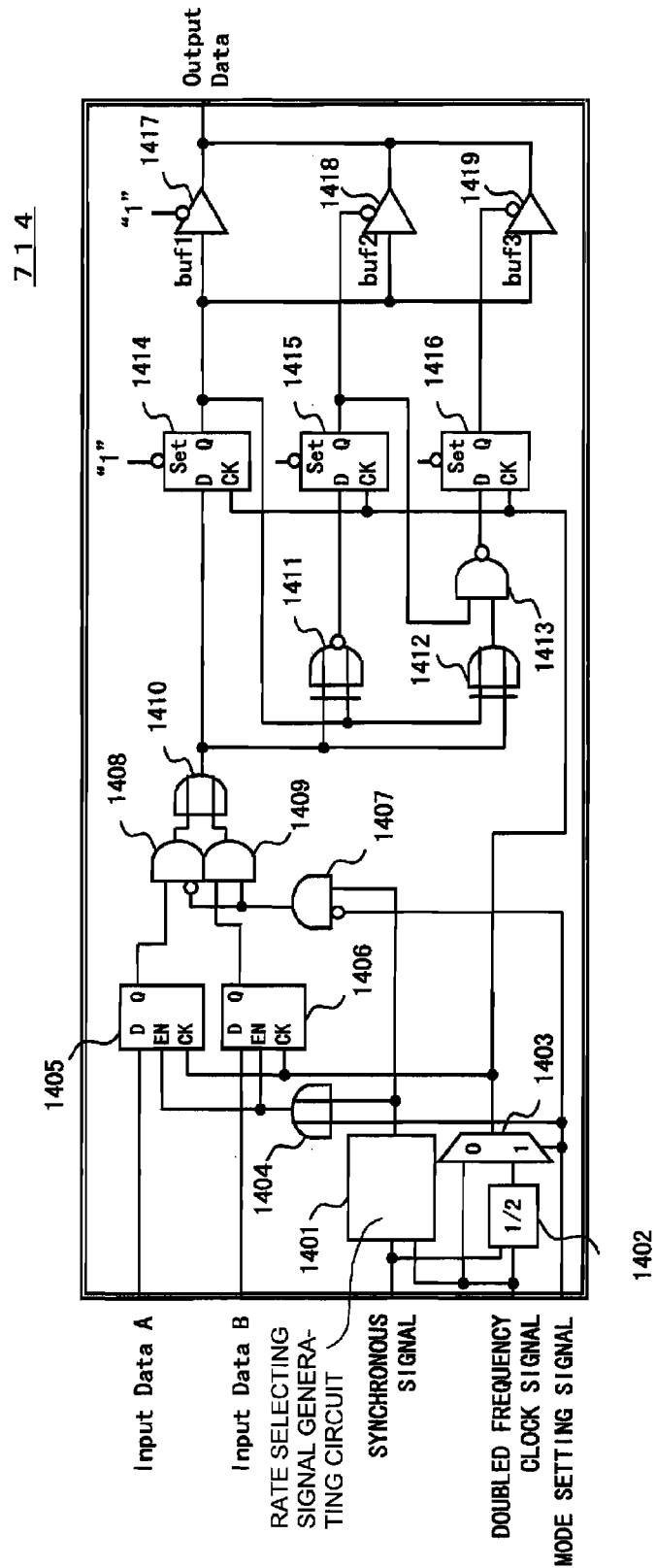
F I G. 14

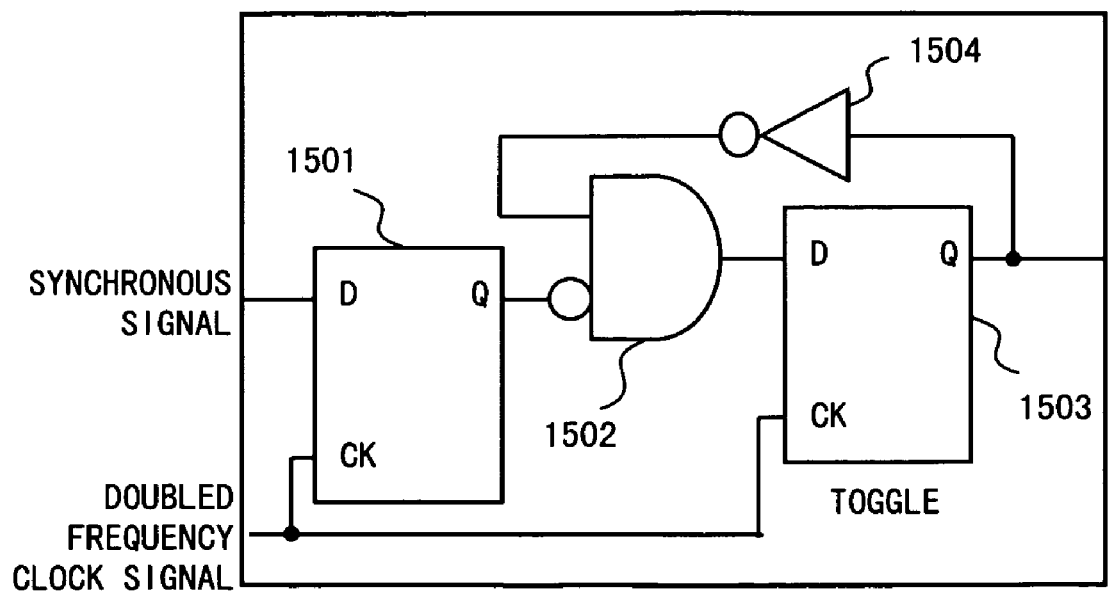
F I G. 1 5

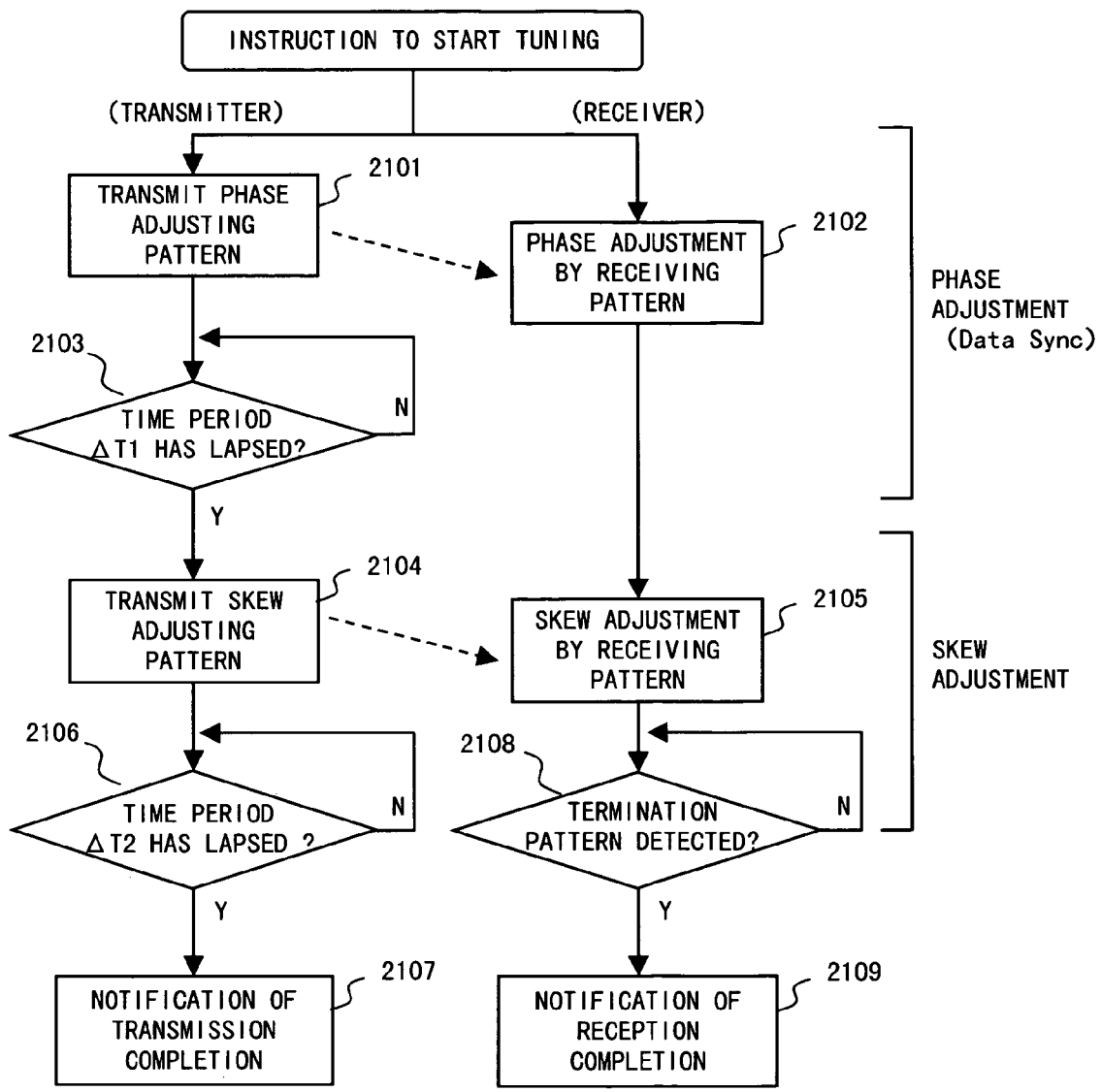
F I G. 21

DEVICE AND METHOD FOR SYNCHRONOUS DATA TRANSMISSION USING REFERENCE SIGNAL

BACKGROUND OF THE INVENTION

1. Field of the Invention

The present invention relates to a data transmission between devices such as semiconductor chips, having a high-speed interface.

2. Description of Related Art

As seen in a data transmission between a processor LSI (Large Scale Integration) and a chipset LSI in a computer, when a data transmission is performed between semiconductor chips, it is essential to provide a sufficient setup and hold times for a data signal. According to the conventional method, as disclosed in JP-A-8-102729 for instance, a clock signal of a transmitter chip is transmitted to a receiver chip, which delays the received clock signal to ensure the setup time and hold time.

FIG. 1A shows a structure for transmitting parallel data of plural bits according to the conventional source synchronous method. The transmitter chip 11 has a delay circuit 21, flip-flop (FF) circuits 22-i, and output circuits 23 and 24-i (i=1, 2, ..., N), while a receiver chip 12 has input circuits 25 and 26-i, and flip-flop circuits 27-i (i=1, 2, N).

The source synchronous method is such that when a data transmission is performed between such chips, the clock signal used in the transmitter chip 11 (or the receiver chip 12) is given a fixed delay and transmitted together with data signals to the receiver chip 12. In the receiver chip 12, the data signals are strobed with the clock signal transmitted from the transmitter chip 11, as shown in FIG. 1B.

The fixed delay given to the clock signal is determined, by taking into consideration various delays (e.g., of board wiring, internal wiring of LSI, and driver/receiver) and process variation, to be within a range ensuring the setup and hold times of the flip-flop circuits 27-i in the receiver. The wiring between the chips is, in principle, an equal length wiring, for reducing a phase variation between/among channels of a transmission path.[0006]

The source synchronous method is advantageous in that it is relatively easy to create an adjusting circuit, since adjustment is required merely for the clock signal. However, it is required that a range of phase variation between/among data signals strobed by the single clock signal be narrower than one cycle of a frequency of the transmitted clock signal. Thus, the source synchronous method has the following limitations:

(1) The wiring between the chips should be an equal length wiring.

(2) The number N of data bits strobed by the single clock signal should be relatively small.

(3) Even if the conditions (1) and (2) are satisfied, data transmission may be impossible in view of a phase variation depending upon the process and transmission degradation.

Each of the following documents relates to a parallel/serial data transmission, a clock signal adjustment, a skew adjustment, a clock signal generation, a timing control, or the like: JP-A-8-102729, JP-A-2000-285144, JP-A-8-044667, JP-A-10-164037, JP-A-2002-044061, JP-A-6-177940, JP-A-8-054955, JP-A-2002-108642, JP-A-2000-134189, JP-A-11-163846, JP-A-5-336091, JP-A-2000-341135, JP-A-2002-223208, JP-A-2003-273852, JP-A-5-225079, and JP-A-5-336210.

In the above-described method where the transmitter chip transmits in parallel the clock signal and a parallel data signal, the range of phase variation with respect to the same clock signal between/among data signals each consisting of a single bit is limited to within one cycle of the frequency of the clock signal. Therefore, it is difficult to realize a high transmission rate. Further, due to the demand of reducing the phase variation between/among data signals each consisting of a single bit of data (which may be hereinafter referred to as a "one-bit data signal"), the constraints including the necessity of wiring the chips to each other with an equal length wiring increase, making designing the package wiring more difficult.

In another method where a function for transmitting a clock signal is not included, but only a function for adjusting a phase of a local clock generated in a PLL (phase-locked loop) in the receiver chip is provided, the requisite that the setup and hold times be ensured may not be satisfied due to a long term jitter in the PLL of the receiver chip.

FIG. 1C shows an ideal clock signal without jitter, as well as a clock signal with a long term jitter as an extreme example. FIG. 1D shows a variation in a clock frequency with time. For instance, when the frequency of the clock signal of a PLL of the transmitter chip becomes high while the frequency of the clock signal of the PLL of the receiver chip becomes low, the requisite of ensuring the setup and hold times may not be satisfied even if each local clock is adjusted.

SUMMARY OF THE INVENTION

Therefore, an object of the invention is to realize a high-speed data transmission in transmitting parallel data of plural bits from a transmitter to a receiver, while suppressing a phase variation between/among one-bit data signals each consisting of a single bit of data.

Another object of the invention is to ensure, when parallel data of plural bits is transmitted from a transmitter to a receiver, a setup time and a hold time of each of one-bit data signals in a receiver.

According to one preferred aspect of the invention, a data transmitter has a synchronous signal generating circuit, a pattern generating circuit, and an output circuit, and transmits parallel data of plural bits to a data receiver. The data receiver according to the invention has a synchronous signal generating circuit, a pattern detecting circuit, a clock adjusting circuit, a data buffer circuit, and a read circuit, and receives the parallel data transmitted from the data transmitter.

In the data transmitter, the synchronous signal generating circuit generates a transmitter synchronous signal using a reference signal, the pattern generating circuit generates a training pattern for each one-bit data signal, in synchronization with the transmitter synchronous signal, and the output circuit sends out the training pattern and each bit of the parallel data, to the data receiver.

In the data receiver, the synchronous signal generating circuit generates a receiver synchronous signal using the reference signal, and the pattern detecting circuit detects the training pattern. The clock adjusting circuit generates an adjusted clock signal for each bit of the parallel data, by adjusting a phase of a first clock signal using each one-bit data signal so that a setup time and a hold time are ensured for the each one-bit data signal. The data buffer circuit loads each one-bit data signal in accordance with the adjusted clock signal and holds a predetermined number of data bits consecutive in time, and a memory position of the data buffer circuit is initialized when the training pattern is detected. The read circuit selects data of plural bits stored in the data buffer circuit in time sequence and reads out the selected data as parallel data, in accordance with a second clock signal and in synchronization with the receiver synchronous signal.

BRIEF DESCRIPTION OF THE DRAWINGS

FIG. 9 illustrates an interchip transmission with a doubled frequency;

FIG. 14 is a schematic diagram of an output circuit;

FIG. 15 is a schematic diagram of a rate selecting signal generating circuit;

FIG. 21 is a flowchart illustrating a tuning processing routine;

DETAILED DESCRIPTION OF THE PREFERRED EMBODIMENTS

There will be described in detail a presently preferred embodiment of the invention, by reference to the accompanying drawings.

Figure 1A:
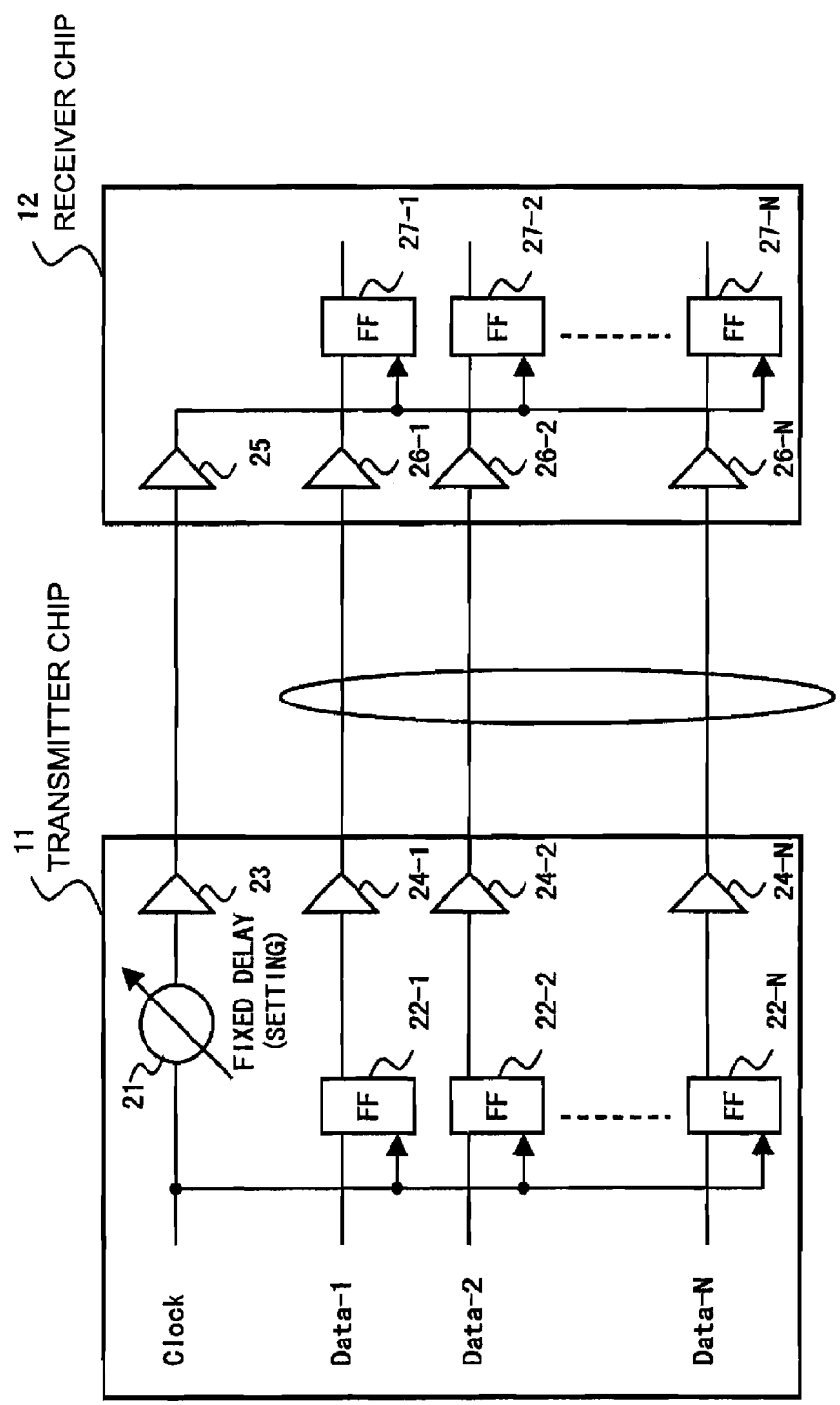
FIG. 1A is a block diagram illustrating the conventional source synchronous method.
Figure 1B:
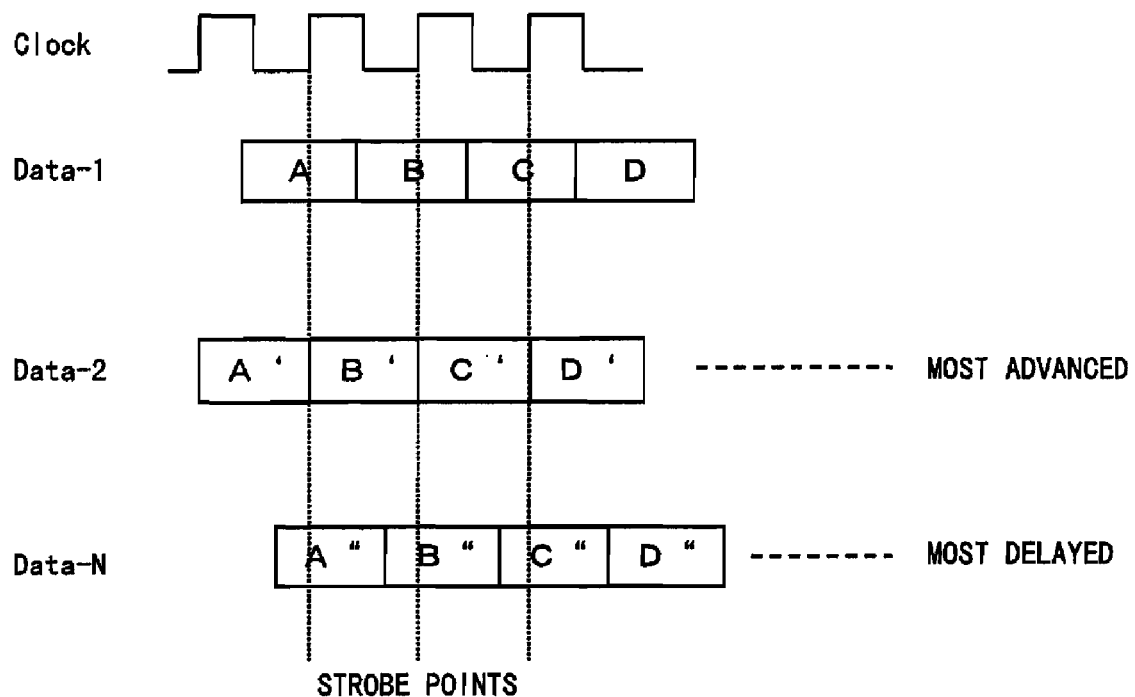
FIG. 1B is a diagram illustrating strobe points in the source synchronous method.
Figure 1C:
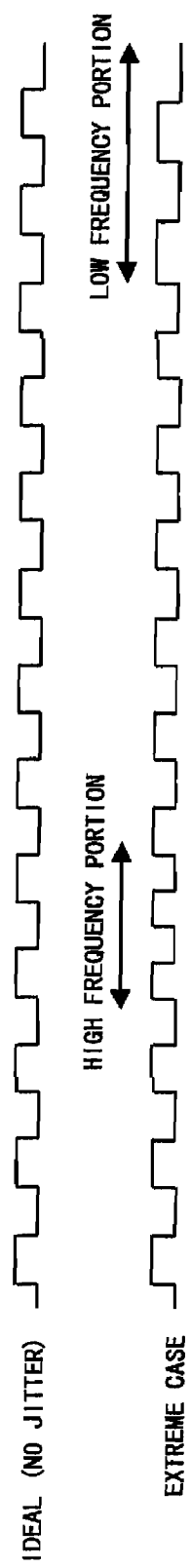
FIG. 1C is a diagram illustrating a long term jitter.
Figure 1:
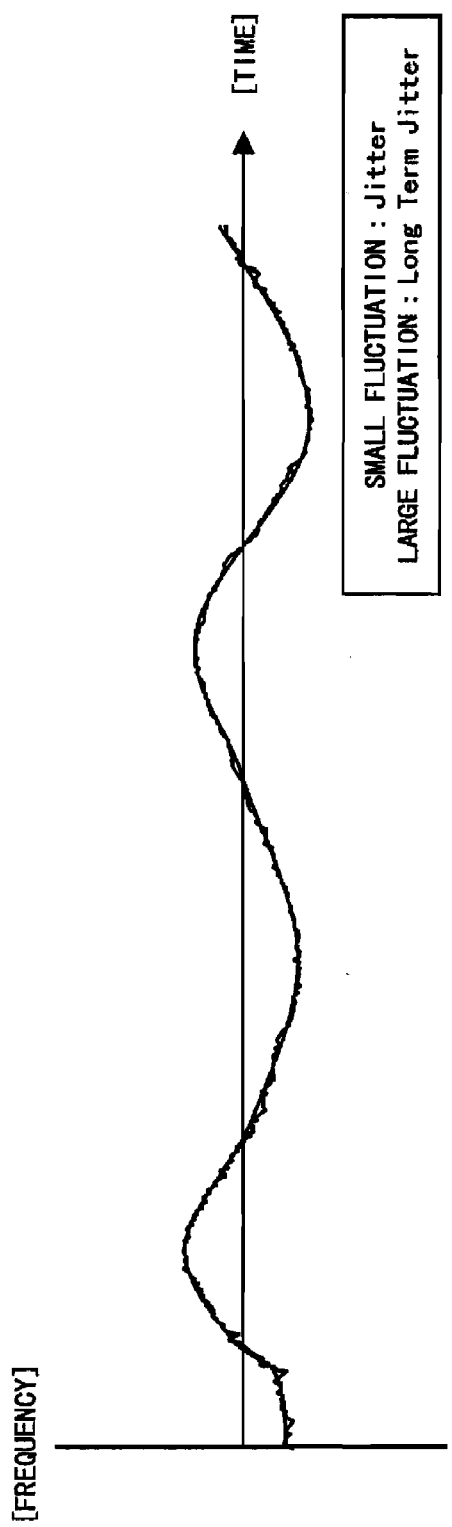
FIG. 1D is a diagram showing a variation in a clock frequency.
Figure 2A:
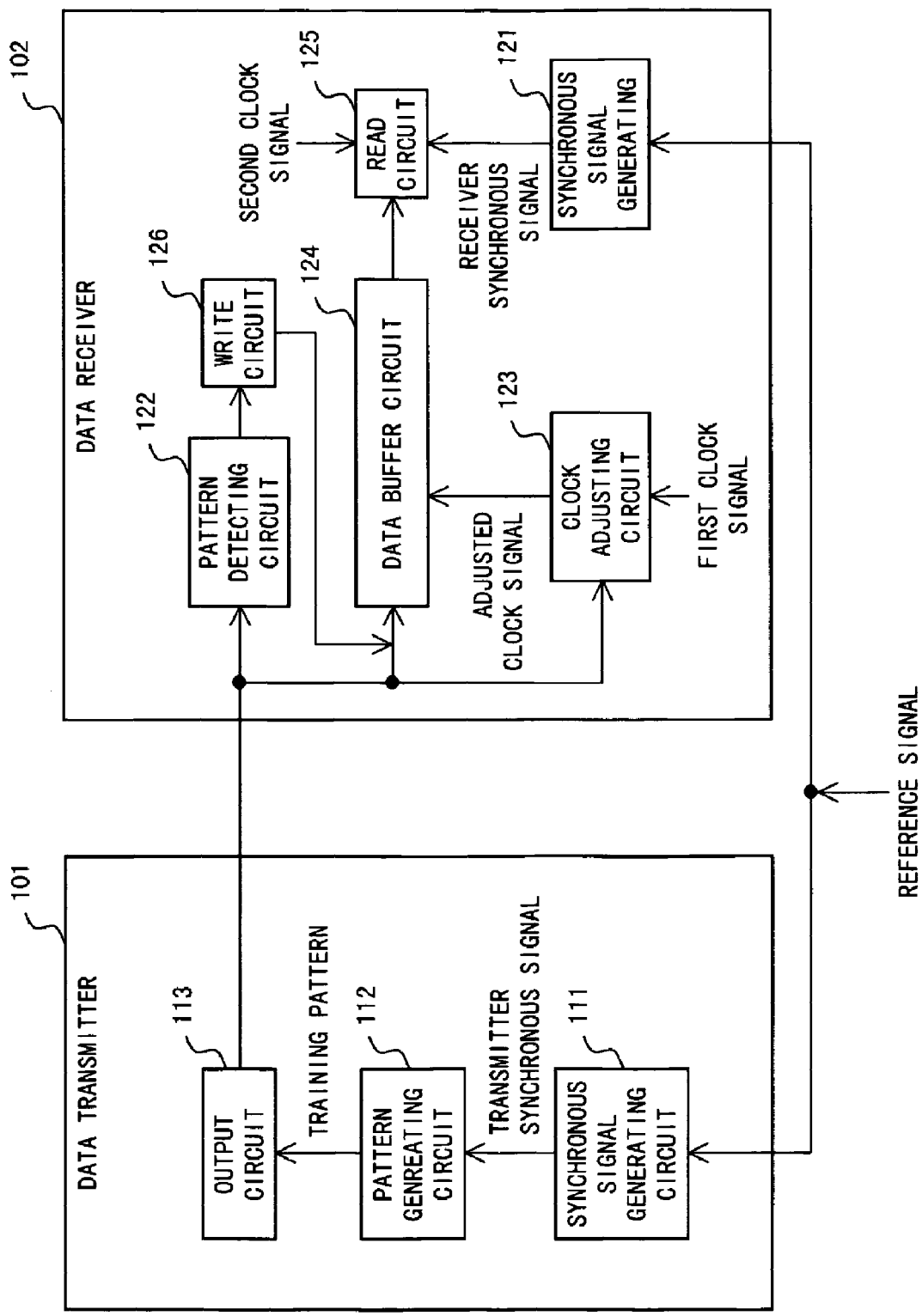
FIG. 2A shows a principle structure of a data transmitter and a data receiver according to the invention.

FIG. 2A shows a principle structure of a data transmitter and a data receiver according to the invention.

In a first aspect of the invention, a data transmitter 101 comprises a synchronous signal generating circuit 111, a pattern generating circuit 112, and an output circuit 113, and transmits parallel data of plural bits to a data receiver 102. The data receiver 102 comprises a synchronous signal generating circuit 121, a pattern detecting circuit 122, a clock adjusting circuit 123, a data buffer circuit 124, and a read circuit 125, and receives the parallel data transmitted from the data transmitter 101.

In the data transmitter 101, the synchronous signal generating circuit 111 generates a transmitter synchronous signal using a reference signal, the pattern generating circuit 112 generates a training pattern for each of data signals (which may be referred to as a "one-bit data signal") each consisting of a single bit of data, in synchronization with the transmitter synchronous signal, and the output circuit 113 sends out the training pattern and the parallel data bit by bit, to the data receiver 102.

In the data receiver 102, the synchronous signal generating circuit 121 generates a receiver synchronous signal using the reference signal, and the pattern detecting circuit 122 detects the training pattern. The clock adjusting circuit 123 generates an adjusted clock signal for each bit of the parallel data, by adjusting a phase of a first clock signal using each one-bit data signal, so that a setup time and a hold time are ensured for the each one-bit data signal. The data buffer circuit 124 loads each one-bit data signal in accordance with the adjusted clock signal, and holds a predetermined number of data bits consecutive in time, and a memory position of the data buffer circuit 124 is initialized when the training pattern is detected. The read circuit 125 selects data of plural bits stored in the data buffer circuit 124 in time sequence and reads out the selected data as parallel data, in accordance with a second clock signal and in synchronization with the receiver synchronous signal.

According to the data transmitter 101 and data receiver 102, the synchronous signals generated from the reference signal common to the transmitting and receiving sides are used, and the training pattern is generated in synchronization with one of the synchronous signals, to ensure a logical synchronization between the data transmitter 101 and data receiver 102. Hence, a high-speed transmission, where the phase variation between/among the one-bit data signals is suppressed without requiring an equal length wiring between the transmitter 101 and receiver 102, is enabled. Further, by adjusting the clock signal by using the one-bit data signals, the setup and hold times of each one-bit data signal are ensured.

In a second aspect of the invention, the data receiver 102 of the first aspect further comprises a write circuit 126. The data buffer circuit 124 includes a predetermined number of buffers for holding the predetermined number of data bits in time sequence. The write circuit 126 holds a write pointer information indicative of one of the buffers where a data bit is to be stored next, and a one-bit data signal is input into the buffer indicated by the write pointer information. The pattern detecting circuit 122 initializes the write pointer information when the training pattern is detected.

According to the data receiver 102, the timing of initialization of a write position in the data buffer circuit 124 is determined using the training pattern generated in synchronization with the transmitter synchronous signal. Thus, a logical synchronization between the transmitter synchronous signal and the timing of the write into the data buffer circuit 124 is ensured.

In a third aspect of the invention, the data buffer circuit 124 of the data receiver 102 of the first aspect includes a predetermined number of buffers for holding a predetermined number of data bits in time sequence. The read circuit 125 holds a read pointer information indicative of one of the buffers from which a data bit is to be read next, and initializes the read pointer information in accordance with the receiver synchronous signal.

According to the data receiver 102, the timing of initialization of a read position in the data buffer circuit 124 is determined by the receiver synchronous signal. Therefore, a logical synchronization between the receiver synchronous signal and the timing of the read from the data buffer circuit 124 is ensured.

Figure 7:
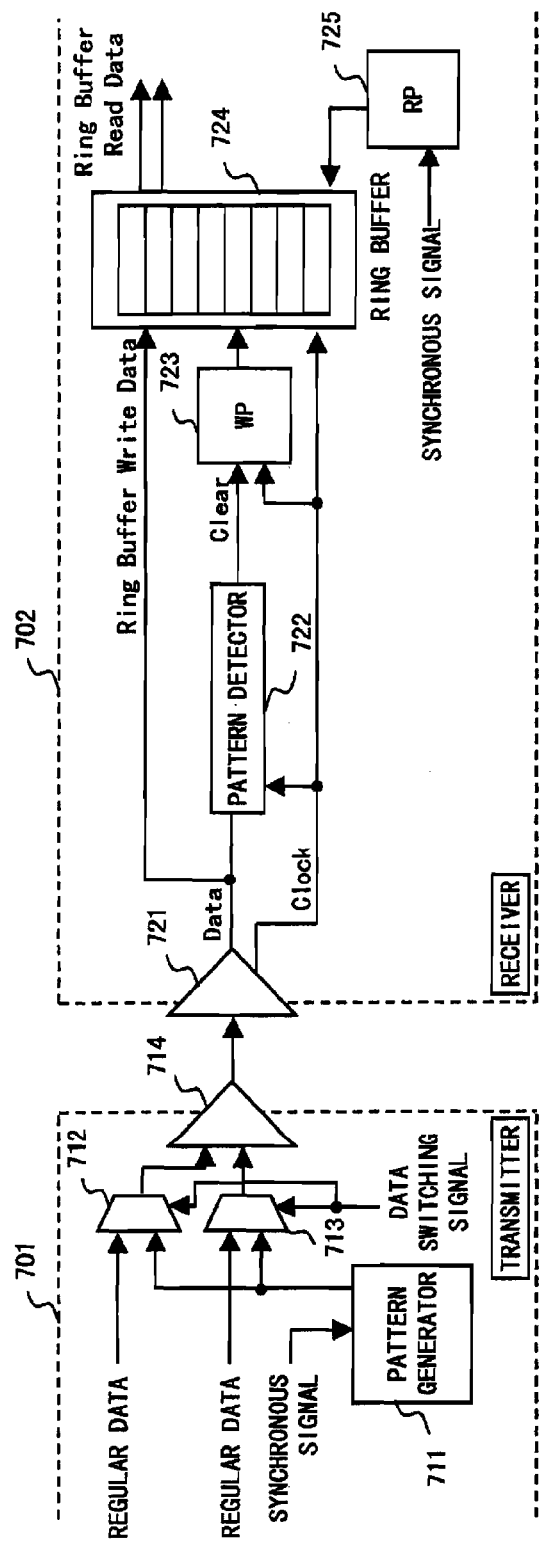
FIG. 7 illustrates a structure of a deskew function between a plurality of chips.

For instance, the data transmitter 101 and the data receiver 102 correspond to each of chips 211-221 shown in FIG. 2B and described later, as well as to a transmitter chip 701 and a receiver chip 702, respectively, which are shown in FIG. 7 and described later. The synchronous signal generating circuits 111, 121 correspond to, for instance, each of synchronous signal generating circuits 231-241 shown in FIG. 2B.

The pattern generating circuit 112, the output circuit 113, the pattern detecting circuit 122, the clock adjusting circuit 123, and the data buffer circuit 124 respectively correspond to, for instance, a pattern generator 711, an output circuit 714, a pattern detector 722, an input circuit 721, and a ring buffer 724, each shown in FIG. 7. The read circuit 125 corresponds to, for instance, a combination of a ring buffer 724 and a read pointer circuit 725 which are shown in FIG. 7, while the write circuit 126 corresponds to, for instance, a combination of a ring buffer 724 and a write pointer circuit 723 which are also shown in FIG. 7.

Thus, a logical synchronization between the data transmitter and data receiver is ensured without the equal length wiring therebetween, enabling a high-speed transmission while reducing the phase variation between/among one-bit data signals of parallel data. Further, the setup and hold times for each one-bit data signal is assured in the data receiver.

Major characteristics of a transmitter chip and a receiver chip according to the present embodiment are as follows:

(1) In the receiver chip, an optimum sampling point (i.e., an optimum clock rising edge) is created from change points of a one-bit data signal. A reference signal is distributed to all chips to perform a data transmission/reception, and a synchronous signal where an H (high) level is established once in n cycles is generated based on the reference signal. A logical synchronization between the transmitter chip and the receiver chip is ensured using a training pattern generated on the basis of the synchronous signal, to realize a synchronous transmission. Thus, the equal length wiring is made inessential for absorbing a skew between/among one-bit data signals.

(2) The clock signal in the transmitter chip is transmitted to the receiver chip, which adjusts the received clock signal. Accordingly, an influence of a long term jitter on a relationship between a PLL of the transmitter chip and a PLL of the receiver chip is eliminated.

(3) A training pattern which is used when a tuning or training for an interchip transmission, or a data transmission between/among a plurality of chips, is performed, is transmitted with a parity bit added thereto, and the receiver chip has a mechanism for checking the parity bit. In this way, the training pattern can be transmitted correctly, without being erroneously detected.

(4) A multiplexer is provided on the output side of the transmitter chip, while a function for dividing a frequency of a clock signal is provided in the receiver chip. This enables a transmission at a rate twice a frequency of an internal clock signal of the chips. For a portion adopting a double rate transmission, the number of wirings between the chips can be decreased by half, enabling reduction in the number of terminals of a chip. Further, since a shortage of terminals is resolved and functions capable of being implemented within a chip can be increased, a multifunction chip is realized, leading to a cost saving.

(5) Where a phase adjustment of a clock signal in the receiver chip is performed merely during a tuning operation, the timing may vary after the tuning operation is terminated, due to variation in the power supply voltage and temperature. Hence, a clock phase adjusting function in the receiver chip is held active, not only during the tuning operation, but also during a system of the synchronous transmission is actually operated. In this way, the variation in the timing due to the variation in the power supply voltage and temperature during the system is operated, can be followed.

(6) In an interchip transmission, if a tuning activation setting is performed separately for each of the chips included in the system, a sequence of an initial setting may become undesirably long and complex. Therefore, one chip in each system is determined to be a "parent" chip, while each of the other chips belongs to the parent chip and incorporates a sequencer which performs a tuning of an interface between the parent chip and itself when the parent chip is activated. The problem of the long and complex initial setting sequence is thus solved.

(7) A training pattern generating circuit for testing is implemented in each chip. An output of the training pattern generating circuit is used as a test signal for the clock adjusting circuit of the receiver chip. In this way, a test for confirming that a transmitting function and a receiving function can normally operate is able to be implemented for each chip independently of the other elements, when the interchip transmission is analyzed.

Figure 2B:
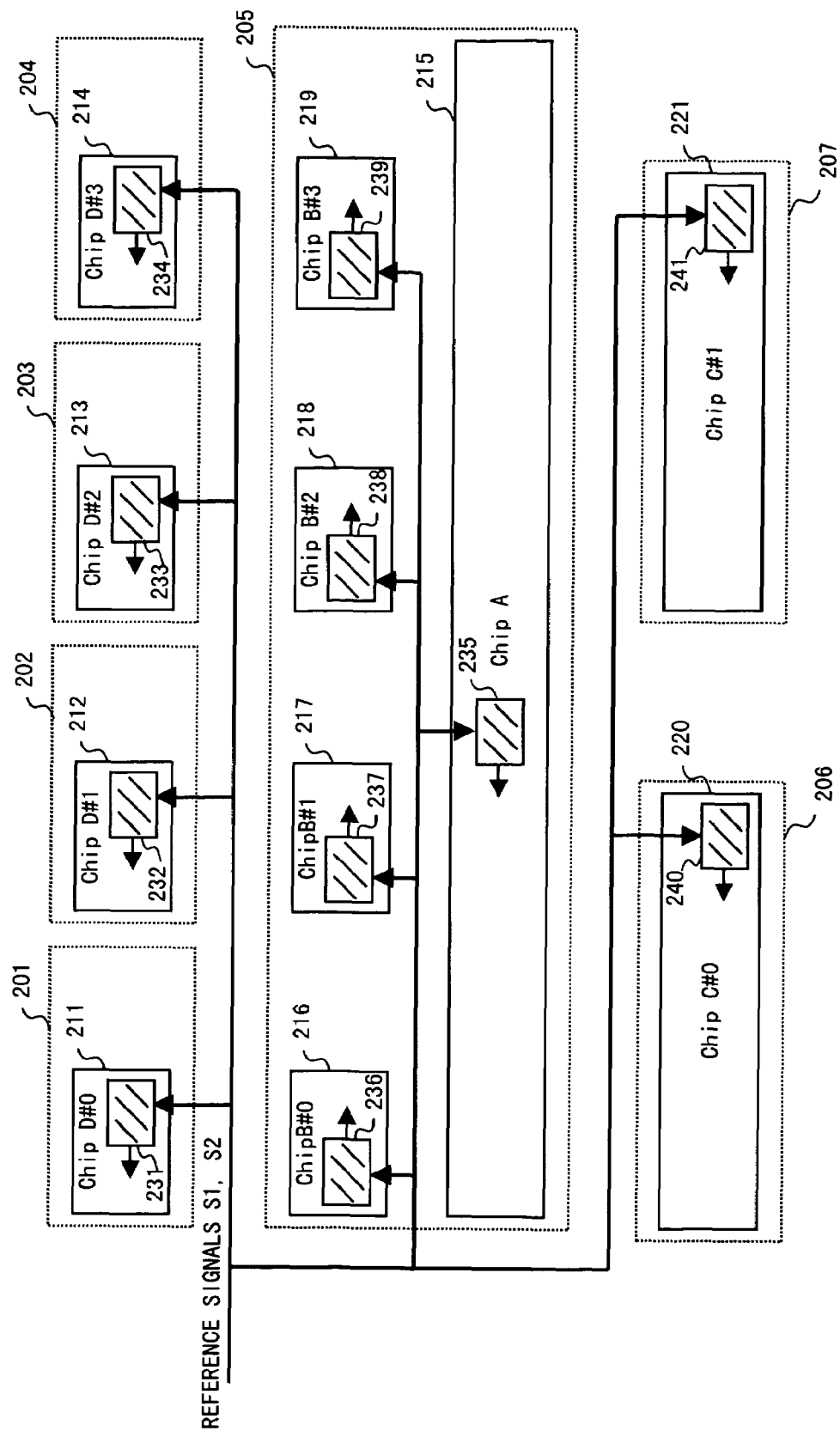
FIG. 2B shows how reference signals S1, S2 are distributed.

FIG. 2B illustrates a method of distributing the reference signal to each chip. A system shown in FIG. 2B comprises boards 201-207. On the boards 201-204 are respectively mounted chips 211-214, while on the boards 206 and 207 are respectively mounted chips 220 and 221. Chips 215-219 are mounted on the board 205. The chips 211-221 respectively have synchronous signal generating circuits 231-241. Two kinds of reference signals, namely, reference signals S1 and S2 are distributed to each of the synchronous signal generating circuits of the chips.

Figure 3:
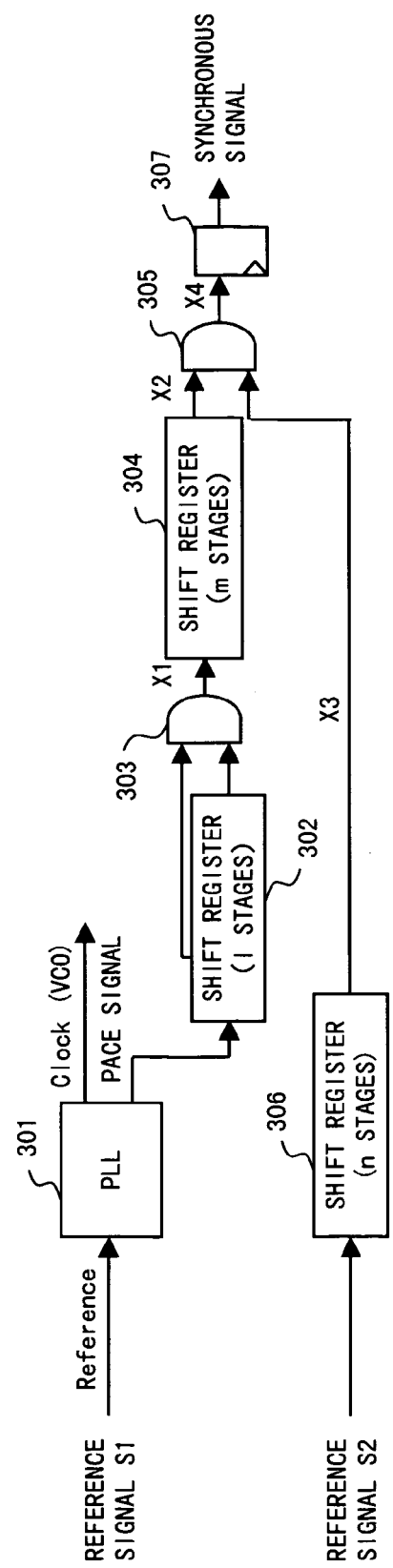
FIG. 3 shows a structure of a synchronous signal generating circuit.
Figure 4:
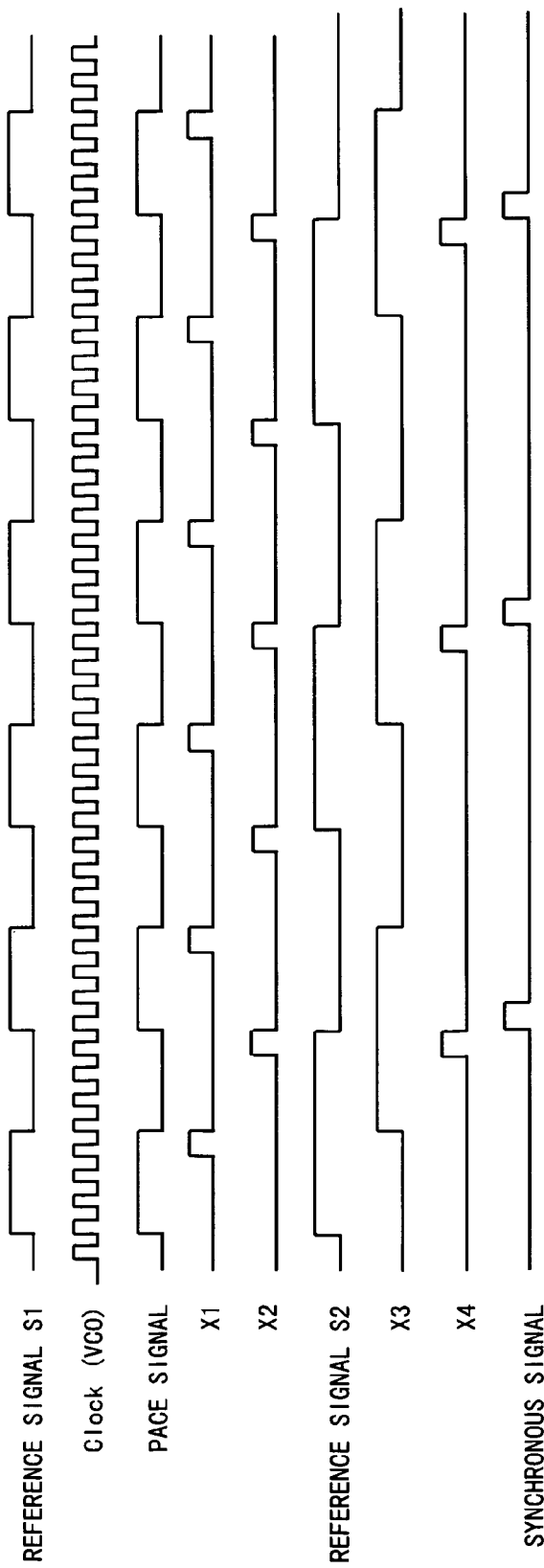
FIG. 4 is a timing chart of the synchronous signal generating circuit.

FIG. 3 shows a structure of each synchronous signal generating circuit, and FIG. 4 is a timing chart of signals in the synchronous signal generating circuit shown in FIG. 3. The synchronous signal generating circuit of FIG. 3 comprises a PLL 301, shift registers 302, 304, 306, AND circuits 303, 305, and a FF circuit 307. The shift registers 302, 304, and 306 are constituted by FF circuits of 1 stages, m stages, and n stages, respectively.

The reference signal S1 is used as a reference clock signal of the PLL 301, while the reference signal S2 is a signal having a frequency double that of the reference signal S1. Having the reference signal S1 as a reference clock signal, the PLL 301 generates a clock signal Clock (VCO) and a pace signal. The pace signal has a same frequency as the reference clock signal.

To detect a differential of the pace signal, the shift register 302 shifts the pace signal by 1 stages using the clock signal Clock (VCO), and the AND circuit 303 outputs a logical product of an output of a FF circuit during the shift of the pace signal and an output of the FF circuit at the final stage of the shift, as a signal X1. Using the clock signal Clock (VCO), the shift register 306 shifts the reference signal S2, which is an asynchronous signal, by n stages to synchronize the reference signal S2, and outputs the shifted reference signal S2 as a signal X3.

The shift register 304 shifts the signal X1 by m stages using the clock signal Clock (VCO), to shift a pulse of the signal X1 around a center of an "H" (high) level period of the signal X3, and outputs the thus shifted signal X1 as a signal X2. The AND circuit 305 outputs a logical product of the signals X2 and X3 as a signal X4. The FF circuit 307 latches the signal X4 and then outputs it as a synchronous signal common to the chips, in accordance with the clock signal Clock (VCO).

The synchronous signal in synchronization with the clock signal Clock (VCO) which has been used in generating the synchronous signal, holds the timing of the reference signals S1 and S2, and rises to "H" level once in n cycles of the clock signal Clock (VCO). In the example of FIG. 4, n is 16.

The transmission among the plurality of chips will be described, by reference to FIGS. 5 and 6. The object to be attained is, to realize a synchronous relationship among the plural chips, i.e., a synchronous relationship in a transmission from multiple chips to a single chip, and from a single chip to multiple chips, as well as to realize an interchip transmission at a frequency double of that in the chips.

Figure 5:
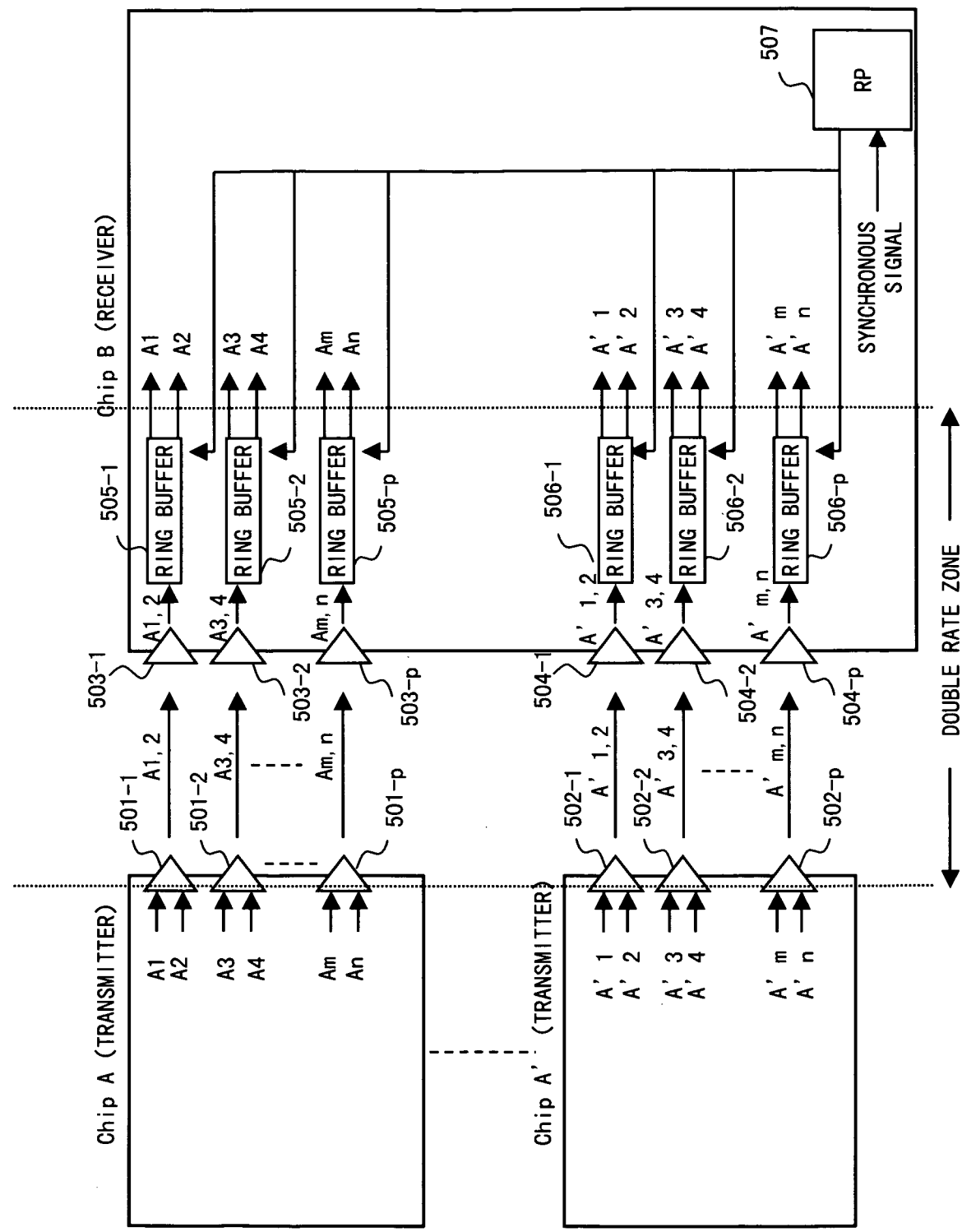
FIG. 5 illustrates a synchronous transmission among a plurality of chips.

FIG. 5 shows a structure for transmitting data at a speed double of that in the chips, from a plurality of transmitter chips A, . . . , A' to a receiver chip B. The transmitter chip A has output circuits 501-i (i=1, 2, . . . , p), while the transmitter chip A' has output circuits 502-i (i=1, 2, . . . , p). The receiver chip B has input circuits 503-i, 504-i, ring buffers 505-i, 506-i (i=1, 2, . . . , p), and a read pointer circuit 507.

Each of the output circuits 501-i and 502-i outputs parallel data of two bits by time division multiplexing to a corresponding one of signal lines constituting a transmission path. The input circuits 503-i and 504-i transfer the data input from the respective signal lines to corresponding ones of the ring buffers 505-i and 506-i, respectively.

Each of the ring buffers 505-i and 506-i is constituted by a plurality of buffers or stages, and holds data bits of the number of the stages consecutive in time. The number of the stages of the ring buffers coincides with the number n of cycles of a frequency of the synchronous signal in which "H" level is established once, as described above.

Each ring buffer loads the value of a newly received data bit in one of buffers or stages thereof, which is designated by the value of a write pointer (WP) The other buffers hold the respective values that have been stored therein. The value of the write pointer indicates the buffer to be written into at the next clock timing, and is cyclically changed to the respective values of all stages of the ring buffers.

The read pointer circuit 507 holds, as read pointers (RPs), values indicating respective buffers or stages of the ring buffers 505-i and 506-i, from which the data bits are to be read out at the next clock timing, respectively. Each read pointer is initialized by the synchronous signal as a trigger, and the value of the each read pointer is cyclically changed to the respective values of all buffers or stages of the corresponding ring buffer, similarly to the case of the write pointer. The readout from the buffer or stage is executed irrespective of the write, such that the data in the buffer or stage indicated by the read pointer is selected in each ring buffer 505-i, 506-i, and read out all at once. Two bits of data stored in adjacent two stages of each ring buffer are simultaneously read.

It can be said that synchronization is achieved between the chips A, . . . , A' and the chip B, when data A1, A2, . . . , Am, An as sent out from the transmitter chip A at a certain time and received by the receiver chip B via the transmission path, is read from the ring buffers 505-i of the receiver chip B, at the same time data A'1, A'2, . . . , A'm, A'n as sent out from the transmitter chip A' is read from the ring buffers 506-i of the receiver chip B.

Figure 6:
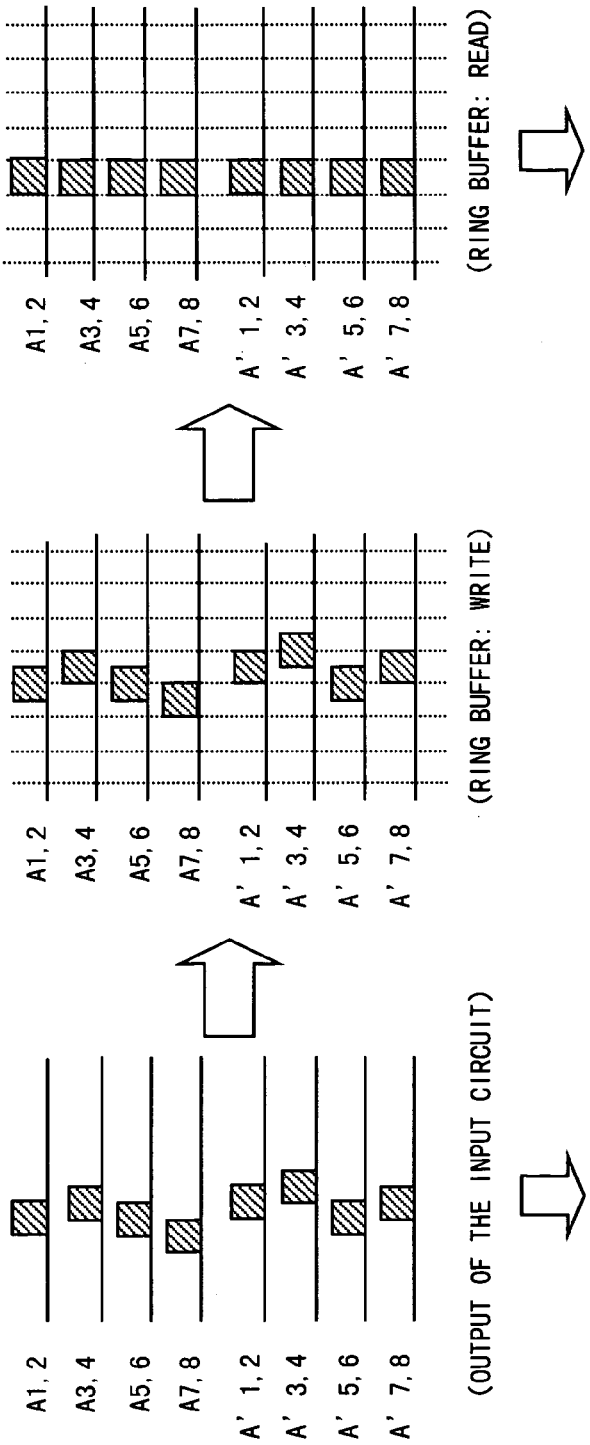
FIG. 6 illustrates a relationship as to synchronization, between a plurality of chips.

FIG. 6 schematically shows the status of the data until the synchronization between the chips is established. The diagram "OUTPUT OF THE INPUT CIRCUIT" on the left side in FIG. 6 shows the state where as a result of a phase adjustment of the clock signal in the input circuits 503-i, 504-i, the phases of respective one-bit data signals are out of synchronization. The diagram "RING BUFFER: WRITE" at the center of FIG. 6 shows the state where the data from the chips A and A' is written into the ring buffers 505-i and 506-i of the chip B, respectively. At this point in time, the interchip synchronization is not established yet.

The diagram "RING BUFFER: READ" on the right side in FIG. 6 shows the state where the data independently written into the ring buffers 505-i and 506-i is read out at a timing of a trigger provided by the synchronous signal, and accordingly the interchip synchronization is established.

FIG. 7 shows a structure for an interchip deskew using a ring buffer. The transmitter chip 701 has the pattern generator 711, selecting circuits 712, 713, and the output circuit 714, while the receiver chip 702 has the input circuit 721, the pattern detector 722, the write pointer circuit 723, the ring buffer 724, and the read pointer circuit 725. The components of the transmitter chip 701 and receiver chip 702 correspond to a part of the entire components of each of the chips shown in FIG. 2B, and each of all chips actually comprises the components of both transmitter and receiver chips.

The pattern generator 711 of the transmitter chip 701 generates a training pattern, by having the synchronous signal shown in FIGS. 3 and 4 as a trigger. Each of the selecting circuits 712, 713 selects either a regular data signal or an output signal of the pattern generator 711, in accordance with a data switching signal, and outputs the selected signal. The output circuit 714 has a function for enhancing a driving force of transmitted data.

The input circuit 721 of the receiver chip 702 has a function for adjusting the phase of the clock signal, and outputs the adjusted clock signal and the received data signal. The pattern detector 722 detects the training pattern from a sequence of the received data signal, and outputs a clearing signal for initializing the write pointer. The write pointer circuit 723 and the read pointer circuit 725 holds the above-described write pointer and read pointer, respectively. The ring buffer 724 stores the data signal outputted from the input circuit 721 into the buffer or stage designated by the write pointer, and outputs the data from the buffer or stage designated by the read pointer.

By the following operations of the transmitter and receiver chips 701, 702, the skew between the data signals are absorbed, establishing the interchip synchronization:

(1) The training pattern is generated based on the synchronous signal of the transmitter chip 701.

(2) In the receiver chip 702, the pattern detector 722 detects the training pattern after the phase adjustment by the input circuit 721, to determine the timing for initializing the write pointer of the write pointer circuit 723 by the clearing signal. After the training pattern is detected, the clearing signal is masked.

(3) The timing for initializing the read pointer is determined by the synchronous signal of the receiver chip 702.

(4) The write/read of the ring buffer 724 is performed in accordance with the write and read pointers. The initial values of the write and read pointers are variable depending upon the setting.

In the transmitter chip 701, during the phase adjustment by the input circuit 721, or the skew adjustment, is performed, the selecting circuits 712, 713 supply the output of the pattern generator 711 to the output circuit 714. The training pattern used in the skew adjustment is generated by having the synchronous signal as a trigger, and may be a repeated pattern of a predetermined cycle.

Figure 8:
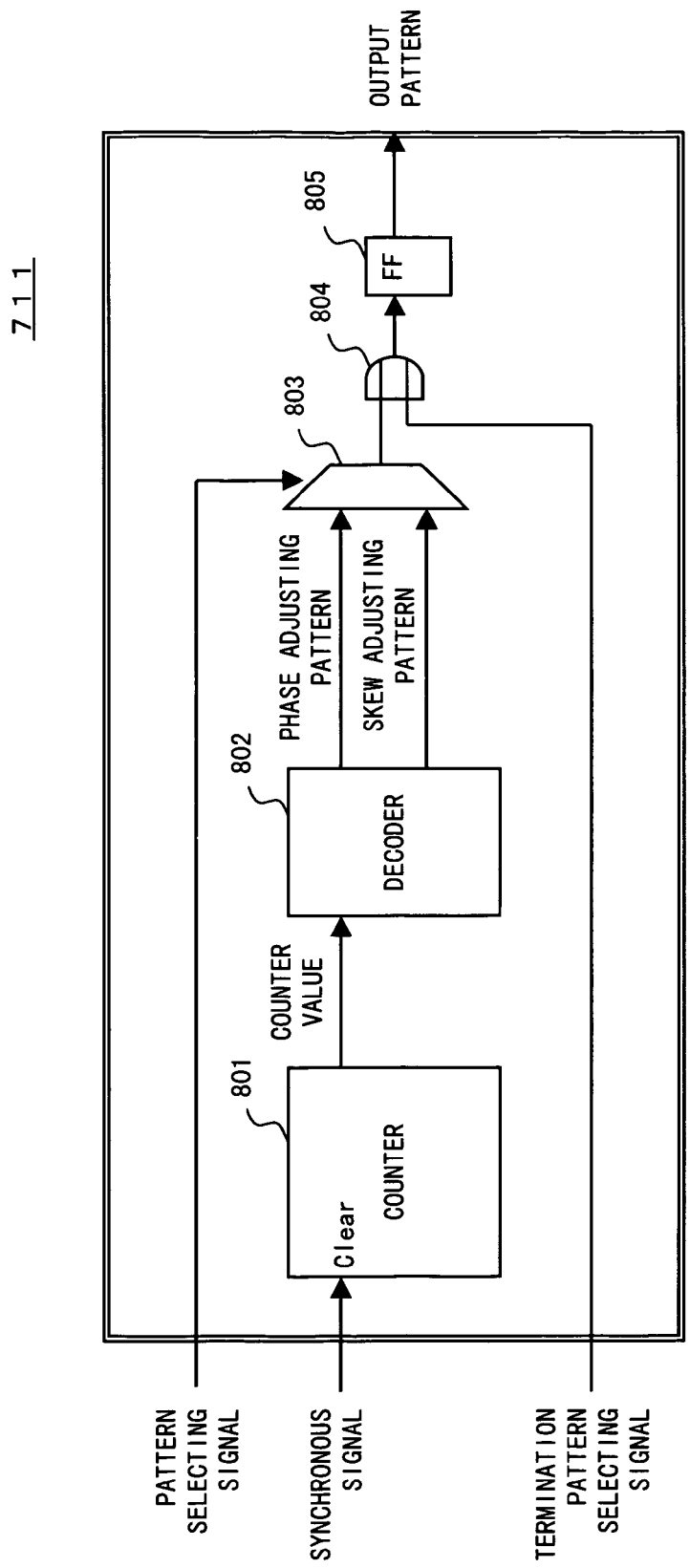
FIG. 8 illustrates a structure of a pattern generator.

FIG. 8 is a diagram of a structure of the pattern generator shown in FIG. 7. The pattern generator 711 shown in FIG. 8 comprises a counter 801, a decoder 802, a selecting circuit 803, an OR circuit 804, and a FF circuit 805. The counter 801 implements its counting operation to output a counter value while the synchronous signal is at "L" (low) level, and clears the counter value when the synchronous signal rises to "H" level.

The decoder 802 decodes the counter value from the counter 801, and outputs a training pattern for the phase adjustment, i.e., phase adjusting pattern, and another training pattern for the skew adjustment, i.e., skew adjusting pattern. The selecting circuit 803 selects either the phase adjusting pattern or the skew adjusting pattern, in accordance with a pattern selecting signal, and outputs the selected pattern. The OR circuit 804 outputs a logical sum of the output from the selecting circuit 803 and a termination pattern selecting signal, and the FF circuit 805 latches the output of the OR circuit 804, to output it as an output pattern.

Figure 10:
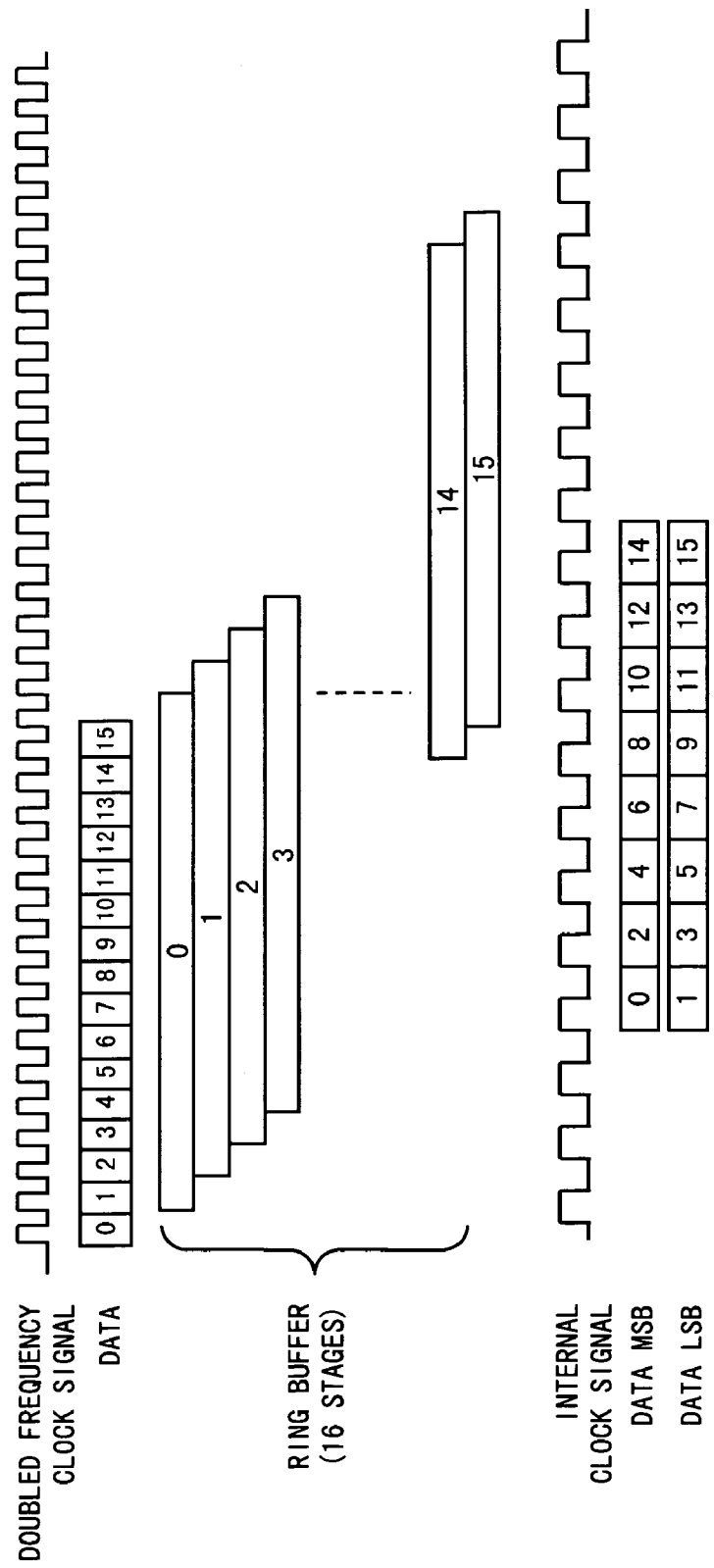
FIG. 10 is a timing chart of the interchip transmission with the doubled frequency.

FIG. 9 shows a structure for performing the interchip transmission at a frequency double that in the chips, while FIG. 10 is a timing chart of the interchip transmission according to the structure.

The output circuit 714 of the transmitter chip 701 shown in FIG. 7 includes a multiplexer 901 and a FF circuit 902, and multiplexes the adjacent two one-bit data signals in the chip by a clock signal of a rate double that of the clock signal in the chip (i.e., an internal clock signal), and outputs the multiplexed signals to the transmission path. The clock signal of the double rate may be referred to as a "doubled frequency clock signal" hereinafter. The input circuit 721 of the receiver chip 702 adjusts a phase of a clock signal having a frequency double that of the internal clock signal of the receiver chip 702, and outputs the adjusted doubled frequency clock signal. In this way, the data bits are transmitted at the double rate between the point when outputted from the output circuit 714 and the point when written into the ring buffer 724.

The read pointer circuit 725 updates the read pointer, following the internal clock signal, and two data bits are simultaneously read out from two buffers or stages of the ring buffer 724 which are designated by the read pointer. In this way, the interchip transmission at the frequency double that in the chips is realized.

In the present embodiment, the doubled frequency clock signal corresponds to the clock signal Clock (VCO) in FIG. 3, and the internal clock signal is generated, for instance, by dividing the frequency of the doubled frequency clock signal in the chip.

Figure 11:
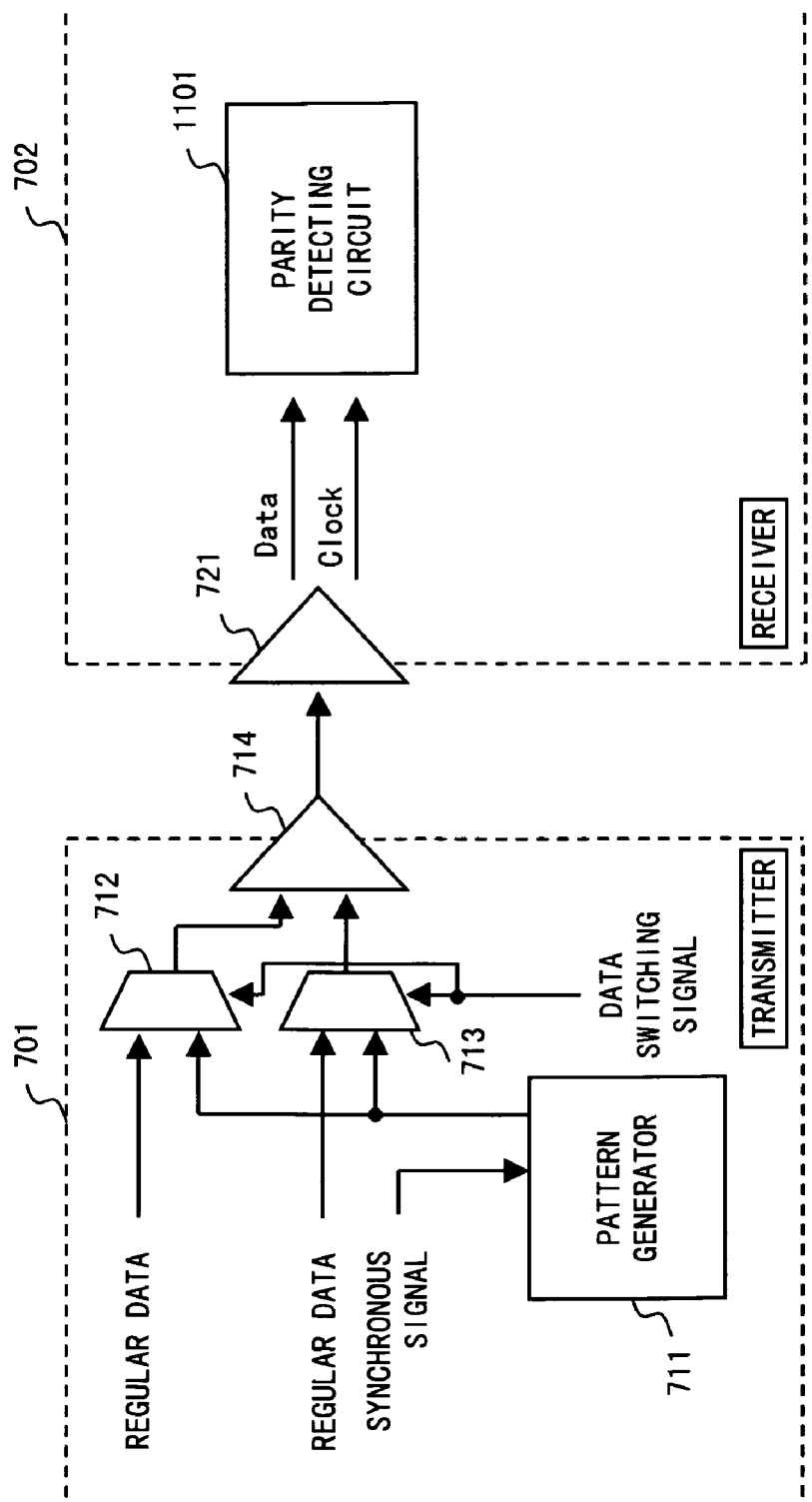
FIG. 11 illustrates a structure for a parity check.

FIG. 11 shows a structure for transmitting a training pattern for a tuning by adding a parity bit thereto, to perform a parity check. In this embodiment, a parity-bit generating circuit is included in the output circuit 714 of the transmitter chip 701, while a parity detecting circuit 1101 is included in the receiver chip 702.

Figure 12:
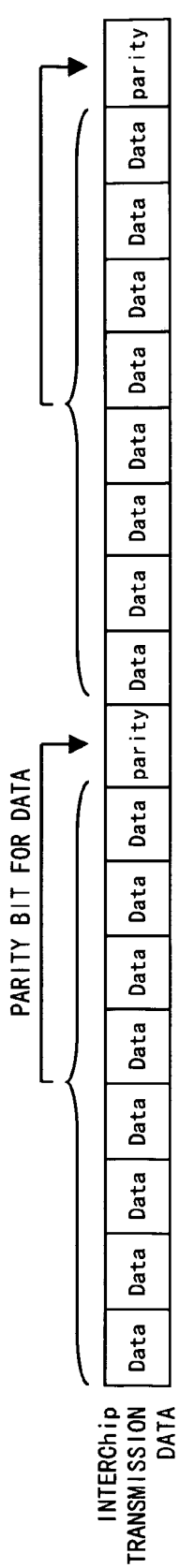
FIG. 12 shows transmission data to which parity bits are added.

As shown in FIG. 12, the parity-bit generating circuit of the transmitter chip 701 adds the parity bit of a single bit, to serial data of a predetermined number of bits, during the tuning. The parity detecting circuit 1101 of the receiver chip 702 detects the parity bit from the received data signal sequence, to perform a parity check. Thus, the integrity of the data bits transmitted over the respective signal lines can be confirmed line by line.

Figure 13:
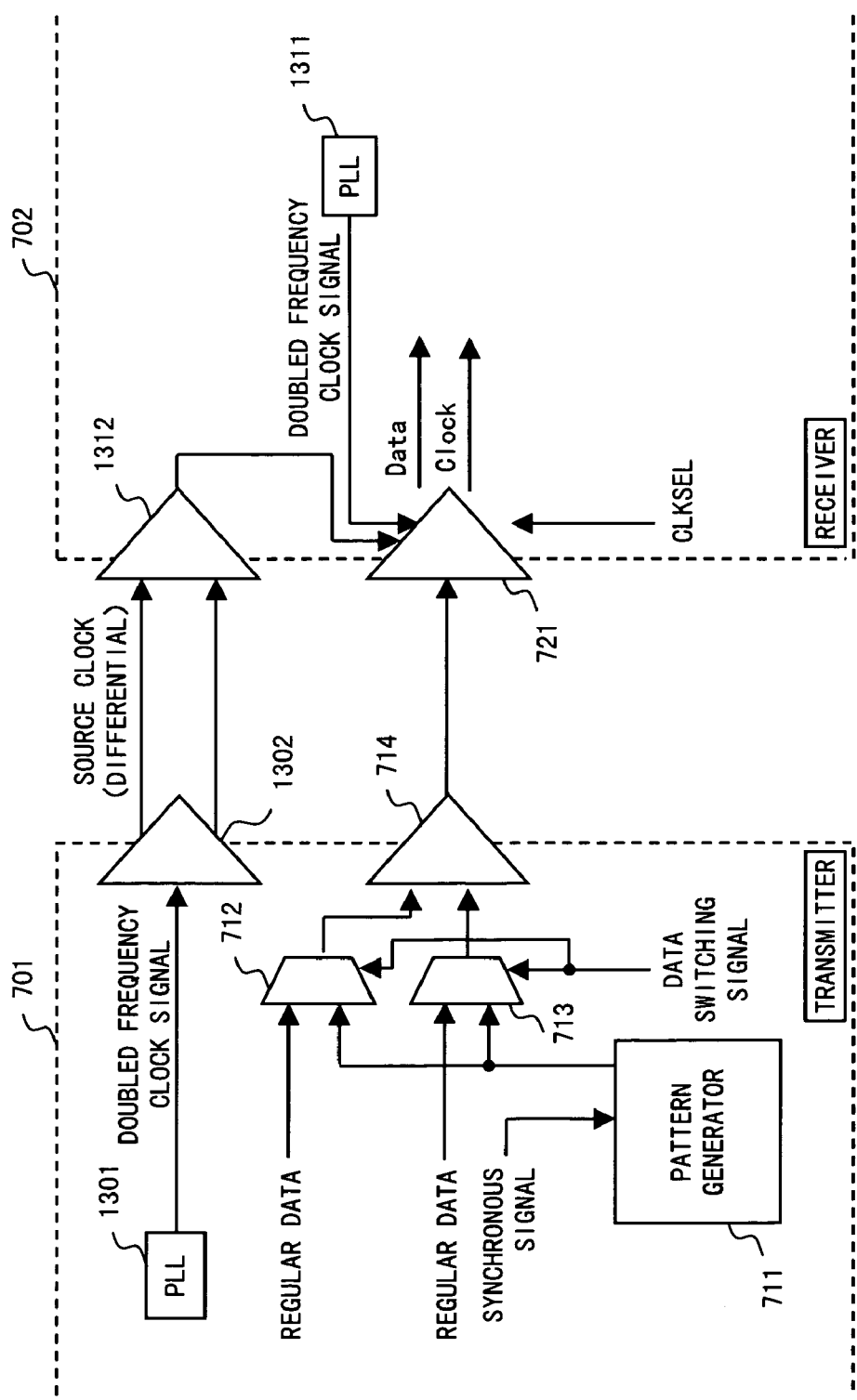
FIG. 13 illustrates how a clock signal is transmitted.

FIG. 13 shows a structure for transmitting the clock signal from the transmitter chip 701 to the receiver chip 702. In this embodiment, the transmitter chip 701 has a clock-driver dedicated circuit 1302, while the receiver chip 702 has a clock-receiver dedicated circuit 1312. The clock-driver dedicated circuit 1302 transmits, as a source clock signal, the doubled frequency clock signal outputted from the PLL 1301, to the receiver chip 702, and the clock-receiver dedicated circuit 1312 transfers the received source clock signal to the input circuit 721.

The input circuit 721 selects, as an object for the phase adjustment, either the source clock signal or the doubled frequency clock signal outputted from the PLL 1311, in accordance with a clock selecting signal CLKSEL. Selecting the source clock signal is advantageous in the following points rather than the clock signal from the PLL 1311:

Phase variation due to variation in the voltage and temperature immediately after the power is turned on, is decreased.

Influence of the long term jitter of the PLL is reduced.

FIG. 14 shows a structure of the output circuit 714, comprising a rate selecting signal generating circuit 1401, a frequency half dividing circuit 1402, a selecting circuit 1403, OR circuits 1404, 1410, FF circuits 1405, 1406, 1414, 1415, 1416, AND circuits 1407, 1408, 1409, an Exclusive-NOR circuit 1411, an Exclusive-OR circuit 1412, a NAND circuit 1413, and buffers 1417, 1418, 1419.

Among these elements, the rate selecting signal generating circuit 1401, frequency half dividing circuit 1402, selecting circuit 1403, OR circuits 1404, 1410, FF circuits 1405, 1406, and AND circuits 1407, 1408, 1409, cooperate to switch a transmission mode, in accordance with a mode setting signal. Namely, when the mode setting signal is at "H" level, an equal rate transmission mode is selected, while the mode setting signal is at "L" level, a double rate transmission mode is selected.

While the equal rate transmission mode is established, a data transmission at a frequency half that of the doubled frequency clock signal is performed, with one output circuit 714 and one input circuit 721 provided for each of the one-bit data signals. From the ring buffer 724, the data are read out in units of a single bit.

Figure 16:
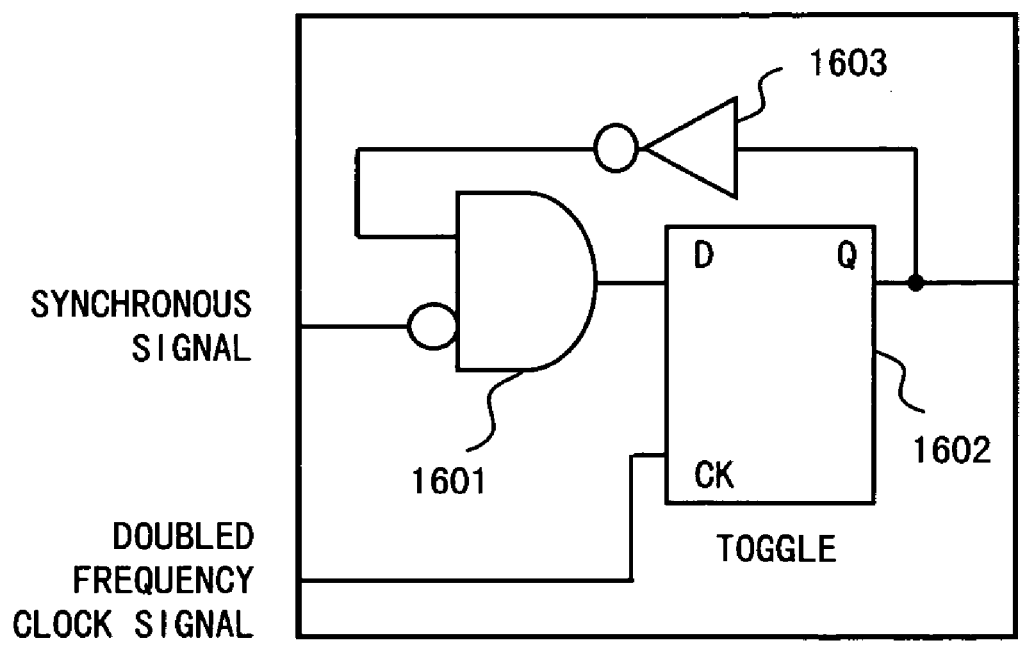
FIG. 16 is a schematic diagram of a frequency half dividing circuit.

The rate selecting signal generating circuit 1401 includes FF circuits 1501, 1503, an AND circuit 1502, and an inverter 1504, as shown in FIG. 15, and generates a rate selecting signal based on the synchronous signal and the doubled frequency clock signal. The frequency half dividing circuit 1402 includes an AND circuit 1601, a FF circuit 1602, and an inverter 1603, as shown in FIG. 16, and generates an equal frequency clock signal having a frequency half that of the doubled frequency clock signal, by frequency-dividing the doubled frequency clock signal.

The selecting circuit 1403 selects and outputs the clock signal outputted from the frequency half dividing circuit 1402 while the mode setting signal is at "H" level, and selects and outputs the doubled frequency clock signal while the mode setting signal is at "L" level. The clock signal outputted from the selecting circuit 1403 is input into respective clock terminals of the FF circuits 1405, 1406, 1414, 1415, 1416.

The OR circuit 1404 outputs, as an input data latch control signal, a logical sum of an output of the rate selecting signal generating circuit 1401 and an output of the selecting circuit 1403, to the FF circuits 1405, 1406. The AND circuit 1407 outputs, as a path selecting signal, a logical product of a negation of the mode setting signal and an output of the rate selecting signal generating circuit 1401, to the AND circuits 1408, 1409.

The FF circuits 1405, 1406 latch the data signals inputted from data input terminals A and B, respectively, in accordance with the input data latch control signal from the OR circuit 1404, and output the data signals in accordance with the clock signal from the selecting circuit 1403. The AND circuits 1408, 1409 and the OR circuit 1410 cooperate to function as a path selecting circuit, and select and output the data signal from the FF circuit 1405 while the path selecting signal from the AND circuit 1407 is at "L" level, and select and output the data signal from the FF circuit 1406 while the path selecting signal is at "H" level.

The Exclusive-NOR circuit 1411, Exclusive-OR circuit 1412, NAND circuit 1413, FF circuits 1414, 1415, 1416, and buffers 1417, 1418, 1419 cooperate to perform a peaking operation for emphasizing the edges of the output data signals.

Figure 17:
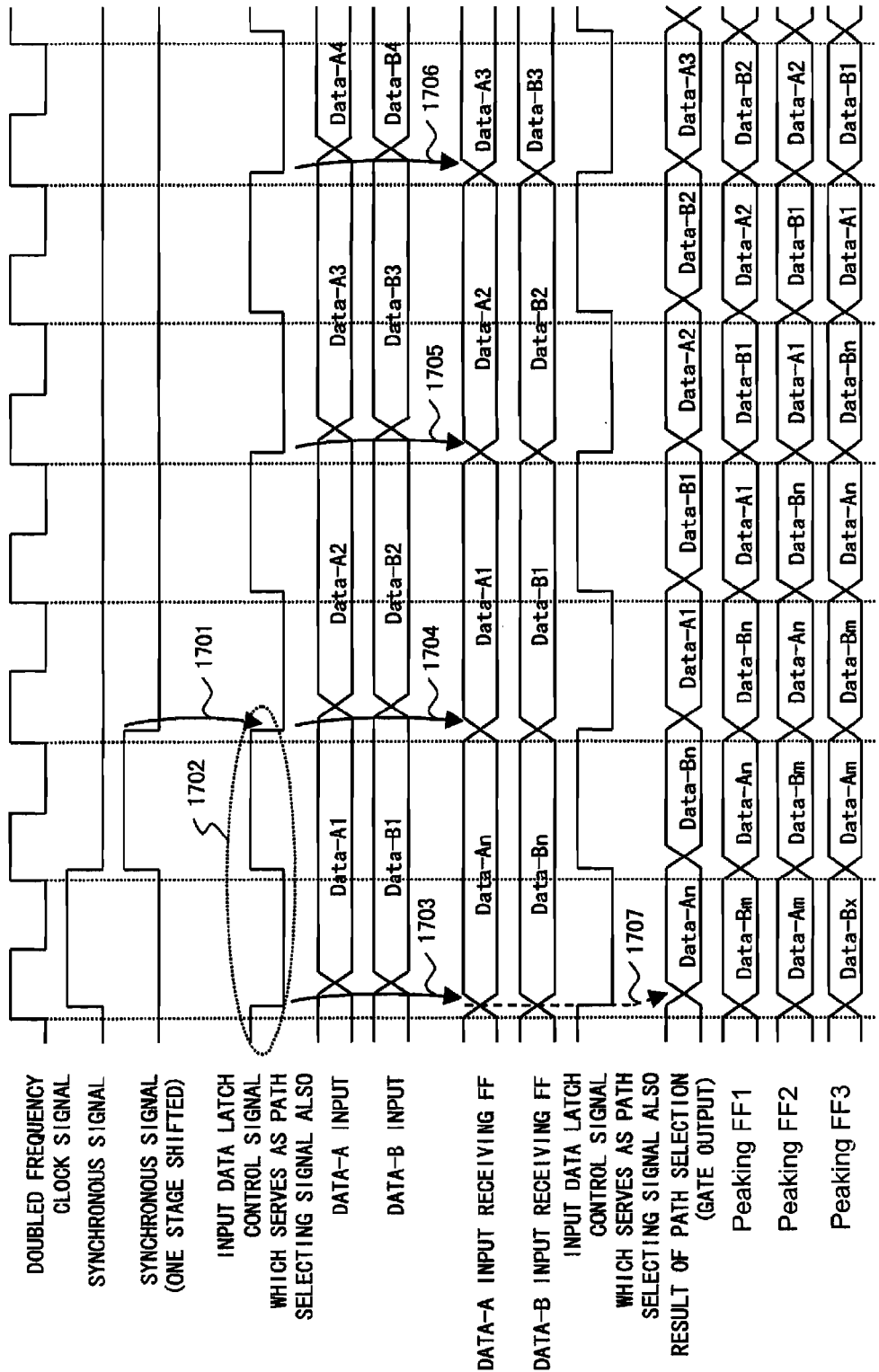
FIG. 17 is a timing chart in a case where a transmission mode is set to a double rate transmission mode.
Figure 18:
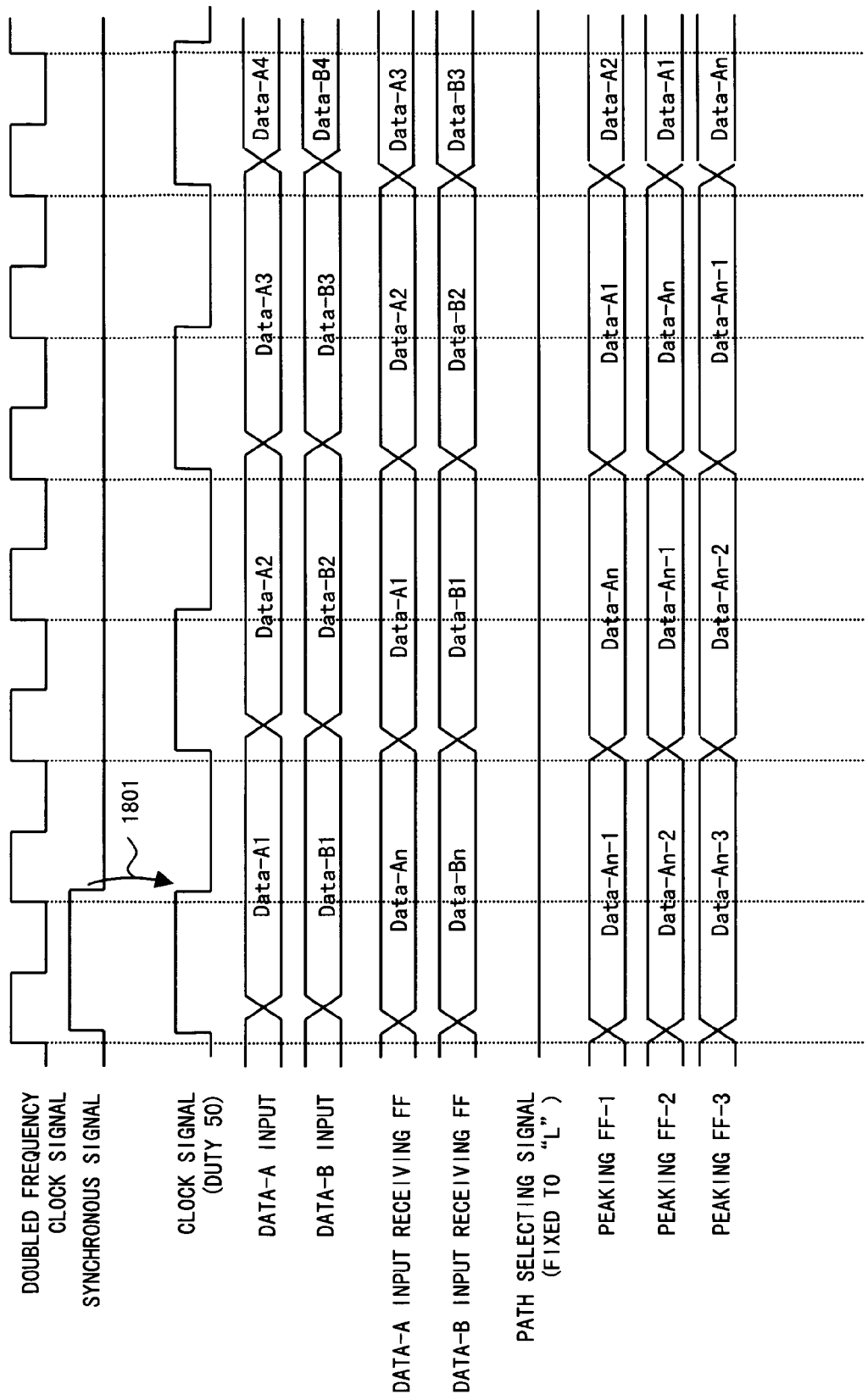
FIG. 18 is a timing chart in a case where a transmission mode is set to an equal rate transmission mode.

FIGS. 17 and 18 are timing charts of the cases where the double rate transmission mode and the equal rate transmission mode are established, respectively In the double rate transmission mode, the rate selecting signal outputted from the rate selecting signal generating circuit 1401 is employed as the input data latch control signal and as the path selecting signal, without being processed. In this mode, the FF circuit 1501 in the rate selecting signal generating circuit 1401 shifts the synchronous signal by one cycle, and the rate selecting signal is cleared to "L" level (1701) in synchronization with a falling edge of the shifted synchronous signal, as shown in FIG. 17. Thereafter, the rate selecting signal inverts or is toggled at the frequency of the doubled frequency clock signal. Until the first synchronous signal is inputted, the status of the rate selecting signal (i.e., "H" or "L") is unknown (1702).

The FF circuits 1405, 1406 latch (1703-1706) the data signals from the data input terminals A, B, respectively, in synchronization with falling edges of the input data latch control signal. The path selecting circuit selects (1707) the data signal from the FF circuit 1405, in synchronization with falling edges of the path selecting signal, and selects the data signal from the FF circuit 1406, in synchronization with rising edges of the path selecting signal.

In the equal rate transmission mode, on the other hand, the rate selecting signal outputted from the rate selecting signal generating circuit 1401 is not employed, but the input data latch control signal is fixed at "H" level, while the path selecting signal is fixed at "L" level. In this mode, the clock signal outputted from the frequency half dividing circuit 1402 is cleared to "L" level (1801), in synchronization with a falling edge of the synchronous signal, and inverts or is toggled at the frequency of the doubled frequency clock signal, as shown in FIG. 18, Following this clock signal, the FF circuits 1405, 1406 latch the data signals from the data input terminals A, B, respectively, and the path selecting circuit constantly selects the data signal from the FF circuit 1405, in accordance with the path selecting signal.

Figure 19:
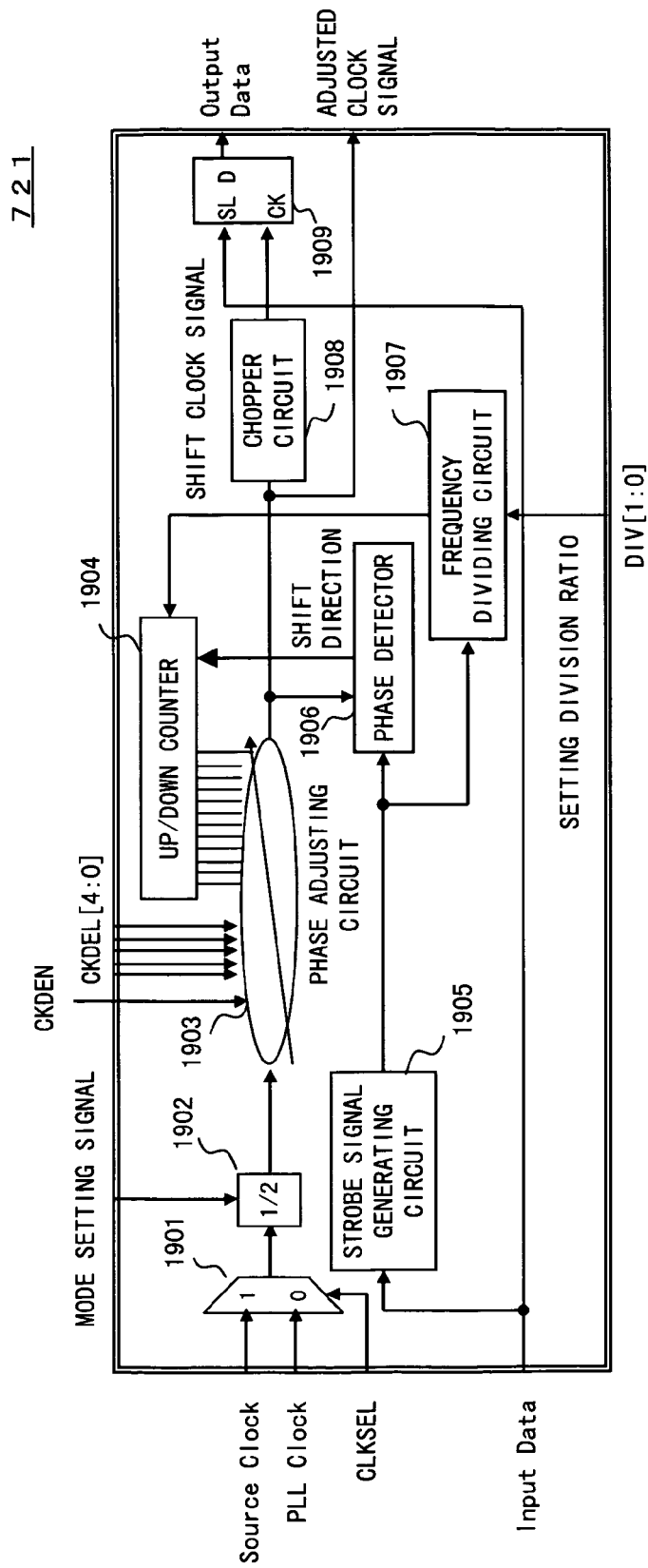
FIG. 19 is a schematic diagram of an input circuit.

FIG. 19 shows a structure of the input circuit 721, which has a selecting circuit 1901, a frequency dividing circuit 1902, a phase adjusting circuit 1903, an up/down counter 1904, a strobe signal generating circuit 1905, a phase detector 1906, a frequency dividing circuit 1907, a chopper circuit 1908, and a latch circuit 1909. The input circuit 721 detects the level ("H" or "L") of the input clock signal at the change points of the data signal, and adjusts the phase of the clock signal so that the data can be received at a good timing which ensures the setup and hold times.

The strobe signal generating circuit 1905 detects the change points of the data signal. The phase detector 1906 receives, at the change points of the data signal, the adjusted clock signal to detect the level of the clock signal, and outputs a control signal designating a count direction or shift direction of the up/down counter 1904.

The frequency dividing circuit 1907 generates a shift clock signal for the up/down counter 1904 based on the change points of the data signal. The division ratio of the frequency dividing circuit 1907 is set by a signal DIV [1:0]. The up/down counter 1904 implements its counting operation in the count direction designated by the phase detector 1906, in accordance with the shift clock signal from the frequency dividing circuit 1907.

The selecting circuit 1901 selects the source clock signal received from the transmitter chip 701 as an object for adjustment while the clock selecting signal CLKSEL is at "H" level, and selects the doubled frequency clock signal outputted from the PLL 1311 as the object for adjustment while the signal CLKSEL is at "L" level. While the mode setting signal is at "H" level (that is, while the equal rate transmission mode is established), the frequency half dividing circuit 1902 frequency-divides the clock signal from the selecting circuit 1901 to generate the equal frequency clock signal whose frequency is half that of the clock signal from the selecting circuit 1901. On the other hand, while the mode setting signal is at "L" level (that is, while the double rate transmission mode is established), the frequency half dividing circuit 1902 outputs the clock signal from the selecting circuit 1901, without processing the clock signal.

The phase adjusting circuit 1903 references the status of the up/down counter 1904 and advances or delays the phase of the clock signal outputted from the frequency half dividing circuit 1902. The clock signal adjusted by the phase adjusting circuit 1903 is outputted from the input circuit 721 as the adjusted clock signal, as well as inputted into the chopper circuit 1908. The latch circuit 1909 latches and outputs the data signal, in accordance with the clock signal from the chopper circuit 1908. In this embodiment, a combination of the chopper circuit 1908 and the latch circuit 1909 is employed for suppressing the cell delay. However, a FF circuit may be employed instead of the combination.

Figure 20:
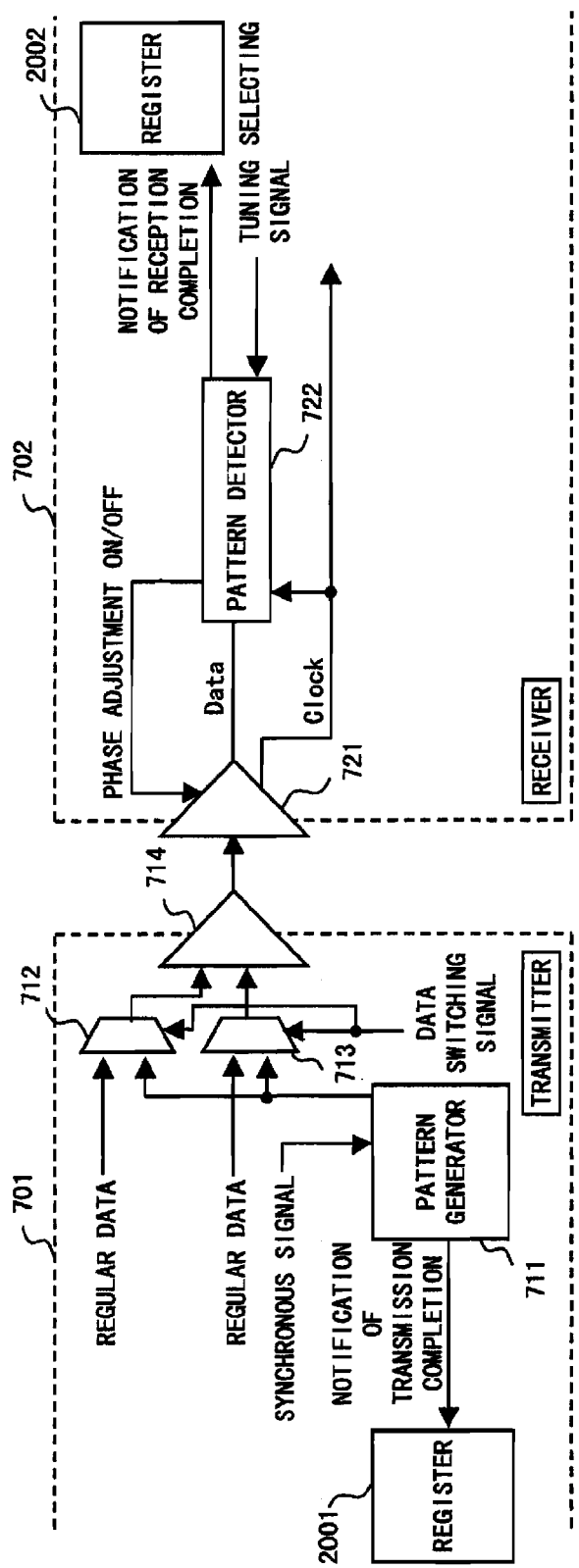
FIG. 20 is a diagram illustrating how a tuning is performed.

FIG. 20 shows a structure for the tuning using the training pattern. FIG. 21 is a flowchart illustrating tuning processing according to the structure. The transmitter and receiver chips 701, 702 in FIG. 20 respectively have registers 2001, 2002.

The tuning is performed in two stages, namely, the phase adjustment and the skew adjustment, and the training pattern transmitted for the adjustments is differentiated depending upon the kind of the adjustment of interest. The tuning is initiated with the pattern generator 711 of the transmitter chip 701 outputting the phase adjusting pattern, and the output circuit 714 transmitting this pattern to the receiver chip 702 (step 2101). For instance, "a 11 '0'" is transmitted before the tuning, while a repetitive pattern of "11101000" (which is the phase adjusting pattern) is transmitted during the phase adjustment. The input circuit 721 of the receiver chip 702 adjusts the phase of the clock signal according to a data signal of the received phase adjusting pattern (step 2102).

After the transmission of the phase adjusting pattern, the pattern generated by the pattern generator 711 is switched, after a lapse of a predetermined time period ΔT1 (step 2103), from the phase adjusting pattern to the skew adjusting pattern (step 2104). As the skew adjusting pattern, "10011101" is transmitted, for instance. The pattern detector 722 in the receiver chip 702 initializes the write pointer of the ring buffer (step 2105) upon detection of the skew adjusting pattern.

After the transmission of the skew adjusting pattern, the pattern generator 711 outputs, after a lapse of a predetermined time period ΔT2 (step 2106), a termination pattern, and writes a notification of transmission completion to the register 2001 (step 2107). At this time, the level of the termination pattern selecting signal shown in FIG. 8 becomes "H", and the termination pattern "a 11 '1'" is transmitted. The transmitter chip 701 switches the transmission data to the regular data while sending out the termination pattern. The pattern detector 722 of the receiver chip 702 writes a notification of reception completion to the register 2002 (step 2109) upon detection of the termination pattern (step 2108).

Execution of the processing flow of FIG. 21 can be made irrespectively of the system configuration or interface, and the phase adjustment is continued after the transmission of the skew adjusting pattern at step 2104. Clearing the notifications of transmission/reception completion written to the registers 2001, 2002 makes the tuning possible to be implemented again.

Figure 22:
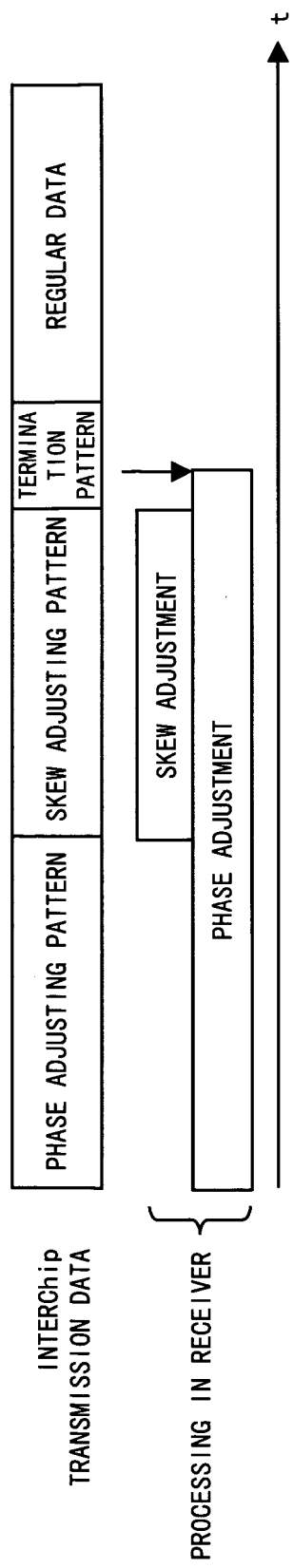
FIG. 22 illustrates first tuning processing.
Figure 23:
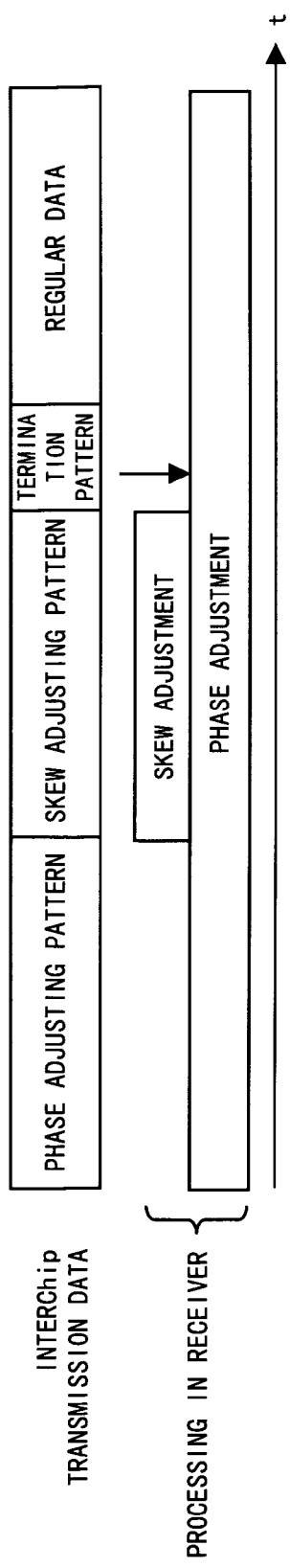
FIG. 23 illustrates second tuning processing.

Upon the detection of the termination pattern, in the receiver chip 702, an instruction to suspend the phase adjustment may be issued to the input circuit 721. When such instruction is issued, a tuning selecting signal for configuring the timing operation is input into the pattern detector 722.

Where there is set a mode in which the phase adjustment is implemented only during the tuning, in accordance with the tuning selecting signal, the pattern detector 722 outputs to the input circuit 721 an instruction to suspend the phase adjustment upon the detection of the termination pattern, so as to stop the phase adjustment, as shown in FIG. 22.

Where there is set another mode in which the phase adjustment is constantly implemented, in accordance with the tuning selecting signal, the pattern detector 722 outputs to the input circuit 721 an instruction to constantly perform the phase adjustment, so as not to stop the phase adjustment even when the termination pattern is detected, as shown in FIG. 23, and accordingly to continue the phase adjustment while receiving the regular data.

Figure 24:
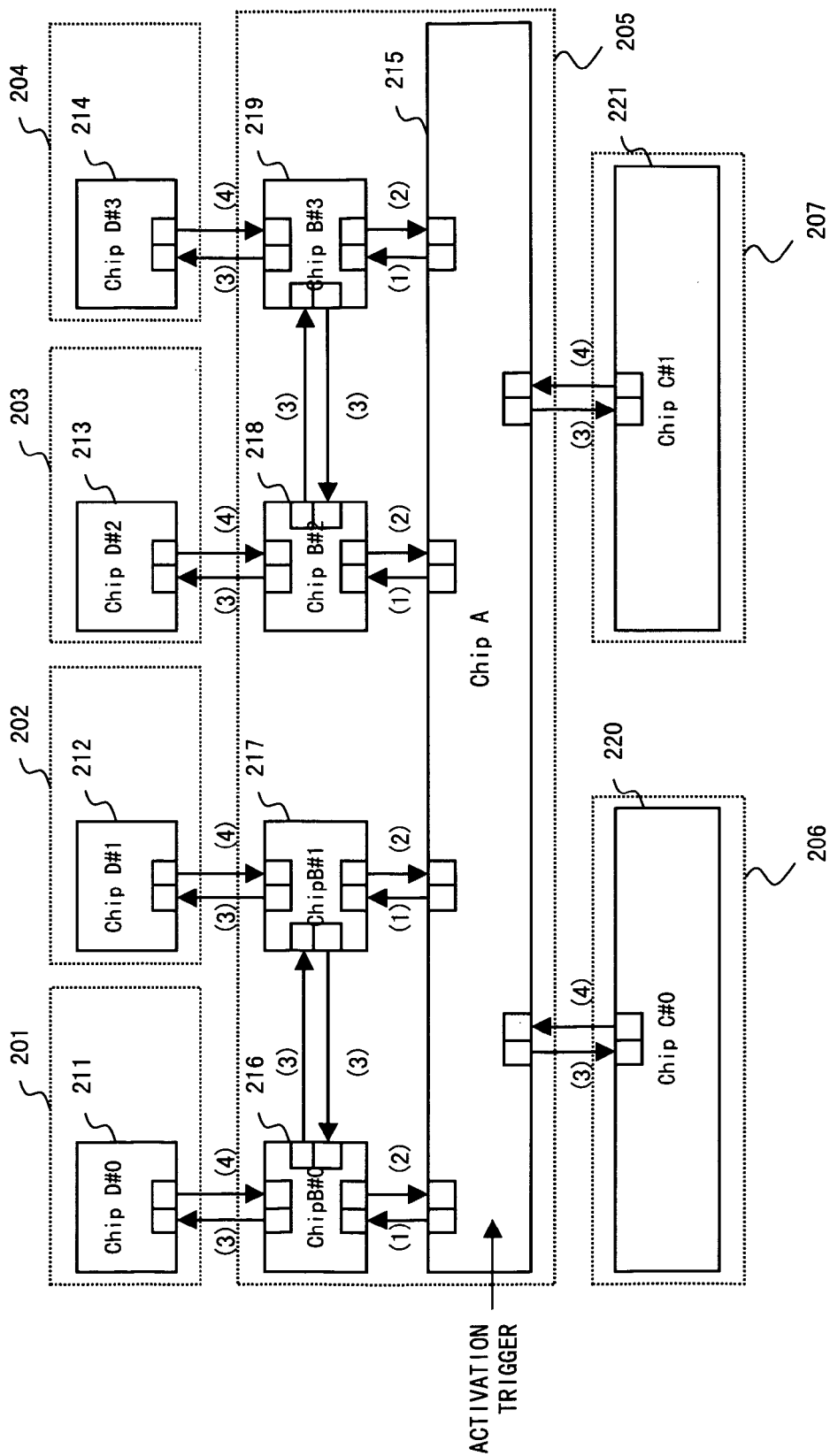
FIG. 24 is a diagram illustrating a calibration sequence.

FIG. 24 illustrates a sequence according to which the tuning or calibration among the chips of the system of FIG. 2B, where the chip 215 is the parent chip, is performed. When the chip 215 is instructed to be activated, the training pattern is transmitted following the procedure of FIG. 21. Each chip autonomously determines whether the transmission/reception is completed, and implements processing of the next step. In this embodiment, the tuning is performed in order of (1)-(4).

Figure 25:
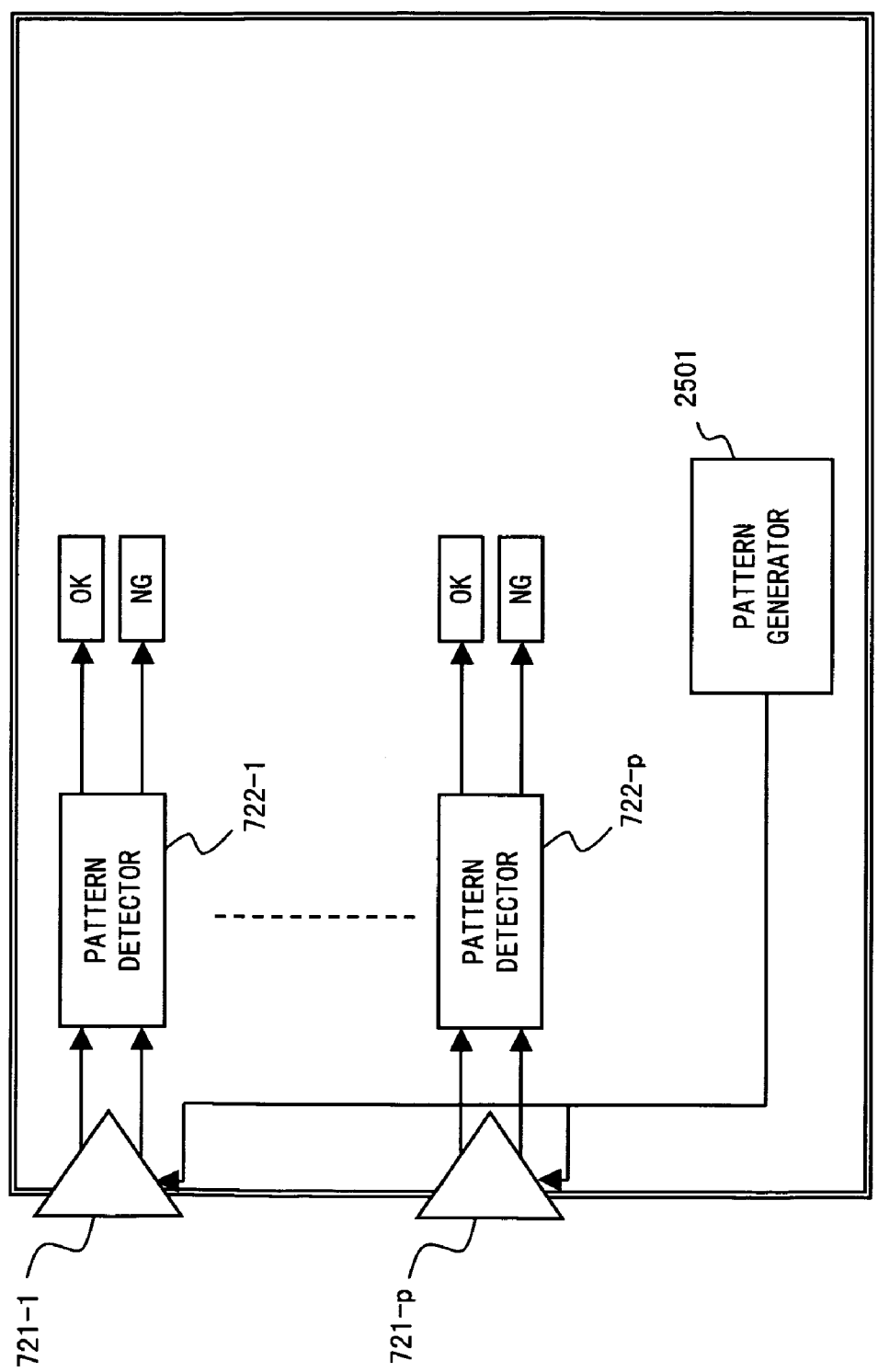
FIG. 25 illustrates a configuration for a test.

FIG. 25 shows a structure for testing the input circuit 721 of the receiver chip 702 comprising p input circuits 721-i for receiving parallel data of p bits, p pattern detectors 722-i (i=1, 2, . . . , p), and a pattern generator 2501 for generating a training pattern for testing, or "test pattern". An output of the pattern generator 2501 is connected to an input terminal for testing of each input circuit 721-i.

The input circuit 721-i performs the phase adjustment, using the test pattern, instead of the phase adjusting pattern transmitted from the transmitter chip 701, and outputs a data signal sequence of the test pattern in accordance with the adjusted clock signal. The pattern detector 722-i detects the test pattern from the outputted data signal sequence, to test a phase adjusting function of the input circuit 721-i. A result of the test is judged bit by bit. When the test pattern is detected, "OK" is outputted. When the test pattern is failed to be detected after already having been detected once, or when the test pattern is not detected at all, "NG" is outputted.

What is claimed is:

1. A data transmitter for transmitting parallel data of plural bits to a receiver, the data transmitter comprising:
a synchronous signal generating circuit which generates a transmitter synchronous signal using a reference signal;
a pattern generating circuit which generates a training pattern for each bit of the parallel data, in synchronization with the transmitter synchronous signal; and
an output circuit which transmits the training pattern and the parallel data bit by bit to the receiver, in which a receiver synchronous signal is generated using the reference signal, a memory position of a data buffer circuit is initialized upon detection of the training pattern, an adjusted clock signal for each bit of the parallel data is generated by adjusting a phase of a first clock signal using each one of one-bit data signals each consisting of a single bit of the parallel data, so that a setup time and a hold time are ensured for each one-bit data signal, each one-bit data signal is loaded into the data buffer circuit in accordance with the adjusted clock signal, a predetermined number of bits of the data consecutive in time is held in the data buffer circuit, and data of plural bits stored in the data buffer circuit is selected in time sequence and read out as parallel data, in accordance with a second clock signal and in synchronization with the receiver synchronous signal.

2. The data transmitter of claim 1,
wherein the output circuit includes a selecting circuit which selects either an equal frequency clock signal having a frequency the same as that of the second clock signal, or a doubled frequency clock signal having a frequency double that of the second clock signal, and
wherein when the equal frequency clock signal is selected, the parallel data is transmitted using the selected equal frequency clock signal, and when the doubled frequency clock signal is selected, the parallel data is transmitted by two bits by time-division multiplexing, using the selected doubled frequency clock signal.

3. The data transmitter of claim 1, wherein the pattern generating circuit outputs the training pattern by dividing the training pattern into a phase adjusting pattern, a skew adjusting pattern, and a termination pattern.

4. A data receiver for receiving parallel data of plural bits transmitted from a transmitter, the data receiver comprising:
a synchronous signal generating circuit which generates a receiver synchronous signal using a reference signal;
a pattern detecting circuit which detects a training pattern transmitted in synchronization with a transmitter synchronous signal generated by the transmitter using the reference signal;
a clock adjusting circuit which generates an adjusted clock signal for each bit of the parallel data by adjusting a phase of a first clock signal using each one of one-bit data signals each consisting of a single bit of the parallel data, so that a setup time and a hold time are ensured for each one-bit data signal;
a data buffer circuit which loads each one-bit data signal in accordance with the adjusted clock signal and holds a predetermined number of bits of the data consecutive in time, and whose memory position is initialized when the training pattern is detected; and
a read circuit which selects data of plural bits stored in the data buffer circuit in time sequence and reads out the selected data as parallel data, in accordance with a second clock signal and in synchronization with the receiver synchronous signal.

5. The data receiver of claim 4, further comprising a write circuit, and
wherein the data buffer circuit includes buffers of the same number as the predetermined number of data bits, for holding the data bits in time sequence,
wherein the write circuit holds a write pointer information indicative of one of the buffers into which a data bit is to be stored next, and inputs the next one-bit data signal into the buffer indicated by the write pointer information, and wherein the pattern detecting circuit initializes the write pointer information when the training pattern is detected.

6. The data receiver of claim 4, wherein the data buffer circuit includes buffers of the same number as the predetermined number of data bits, for holding the data bits in time sequence, and wherein the read circuit holds a read pointer information indicative of one of file buffers from which a data bit is to be read next, and initializes the read pointer information in accordance with the receiver synchronous signal.

7. The data receiver of claim 4, wherein the data buffer circuit includes n buffers for holding the predetermined number of data bits in time sequence, and each of the transmitter synchronous signal and the receiver synchronous signal rises to a high level once every n cycles.

8. The data receiver of claim 4, further comprising:

a clock generating circuit which generates a clock signal; and a selecting circuit which selects, as the first clock signal, either the clock signal generated by the clock generating circuit or a source clock signal transmitted from the transmitter.

9. The data receiver of claim 4, further comprising a parity detecting circuit which detects, when a parity bit is added to a data signal sequence of the training pattern, the parity bit from the received data signal sequence, to perform a parity check.

10. The data receiver of claim 4, wherein the clock adjusting circuit includes a frequency dividing circuit, which generates a clock signal having a frequency half that of the first clock signal by frequency-dividing the first clock signal when the parallel data is transmitted using a clock signal of the same frequency as the second clock signal and the first clock signal has a frequency double that of the second clock signal, and which outputs the first clock signal without processing the first clock signal when the parallel data is transmitted by two bits by time-division multiplexing, using a clock signal of a frequency double that of the second clock signal, the clock adjusting circuit adjusting a phase of a clock signal outputted from the frequency dividing circuit.

11. The data receiver of claim 4, wherein the pattern detecting circuit outputs, to the clock adjusting circuit, a signal instructing to suspend the phase adjustment when the detected training pattern is a termination pattern while a first mode for performing the phase adjustment only during a tuning operation is set, and a signal instructing to continue the phase adjustment even if the detected training pattern is a termination pattern while a second mode for constantly performing the phase adjustment is set.

12. The data receiver of claim 4, further comprising a pattern generating circuit which generates a training pattern for testing, and wherein the pattern detecting circuit detects the training pattern for testing from a data signal sequence transmitted in accordance with the adjusted clock signal, when the clock adjusting circuit adjusts the phase of the first clock signal using the training pattern for testing, so as to test a phase adjusting function of the clock adjusting circuit.

13. A system comprising a plurality of data transmitter-receivers which transmit/receive parallel data of plural bits to/from one another, each of the data transmitter-receivers comprising:

a synchronous signal generating circuit which generates a synchronous signal using a reference signal distributed to the plurality of data transmitter-receivers;

a pattern generating circuit which generates a training pattern for each bit of the parallel data, in synchronization with the synchronous signal;

an output circuit which transmits the training pattern and the parallel data bit by bit to other data transmitter-receiver as a receiving end;

a pattern detecting circuit which detects the training pattern transmitted in synchronization with a synchronous signal generated using the reference signal in one of the data transmitter-receivers as a transmitting end;

a clock adjusting circuit which generates an adjusted clock signal for each bit of the parallel data transmitted from the data transmitter-receiver as the transmitting end, by adjusting a phase of a first clock signal using each one of one-bit data signals each consisting of a single bit of the parallel data, so that a setup time and a hold time are ensured for the each one-bit data signal;

a data buffer circuit which loads each one-bit data signal in accordance with the adjusted clock signal, and holds a predetermined number of data bits consecutive in time, and whose memory position is initialized when the training pattern is detected; and a read circuit which selects data of plural bits stored in the data buffer circuit in time sequence and reads out the selected data as parallel data, in accordance with a second clock signal and in synchronization with the synchronous signal generated by the synchronous signal generating circuit.

14. A system comprising a plurality of data transmitter-receivers which transmit/receive parallel data of plural bits to/from one another, each of the data transmitter-receiver comprising:

a synchronous signal generating circuit which generates a synchronous signal using a reference signal distributed to the plurality of data transmitter-receivers;

a pattern generating circuit which generates a training pattern for each bit of the parallel data, in synchronization with the synchronous signal;

an output circuit which transmits the training pattern and the parallel data bit by bit to other data transmitter-receiver as a receiving end;

a pattern detecting circuit which detects the training pattern transmitted in synchronization with a synchronous signal generated using the reference signal in one of the data transmitter-receivers as a transmitting end;

a clock adjusting circuit which generates an adjusted clock signal for each bit of the parallel data transmitted from the data transmitter-receiver as the transmitting end, by adjusting a phase of a first clock signal using each one of one-bit data signals each consisting of a single bit of the parallel data, so that a setup time and a hold time are ensured for the each one-bit data signal;

a data buffer circuit which loads each one-bit data signal in accordance with the adjusted clock signal, and holds a predetermined number of data bits consecutive in time; and a read circuit which selects data of plural bits stored in the data buffer circuit in time sequence and reads out the selected data as parallel data, in accordance with a second clock signal, and wherein the plurality of transmitter-receivers perform a synchronous transmission of the parallel data, using the synchronous signal generated by the synchronous signal generating circuit, and the training pattern.

15. The system of claim 14, wherein when an instruction to start a tuning is issued to one of the plurality of data transmitter-receivers, a tuning using the training pattern is sequentially performed among the plurality of data transmitter-receivers with the one data transmitter-receiver serving as an origin.

16. A data transmission method for transmitting parallel data of plural bits from a transmitter to a receiver, comprising:
   on the part of the transmitter, generating a transmitter synchronous signal using a reference signal;
   generating a training pattern for each bit of the parallel data, in synchronization with the synchronous signal; and
   transmitting the training pattern and the parallel data bit by bit to the receiver, and
   on the part of the receiver, generating a receiver synchronous signal using the reference signal;
   initializing a memory position of a data buffer circuit when the training pattern is detected;
   generating an adjusted clock signal for each bit of the parallel data by adjusting a phase of a first clock signal using each one of one-bit data signals each consisting of a single bit of the parallel data, so that a setup time and a hold time are ensured for the each one-bit data signal;
   loading each one-bit data signal into the data buffer circuit in accordance with the adjusted clock signal, to hold a predetermined number of data bits consecutive in time in the data buffer circuit; and
   selecting data of plural bits stored in the data buffer circuit in time sequence and reading out the selected data as parallel data, in accordance with a second clock signal.

17. A data transmitter for transmitting parallel data of plural bits to a receiver, the data transmitter comprising:
   a synchronous signal generating circuit which generates a transmitter synchronous signal using a reference signal;
   a pattern generating circuit which generates a training pattern for each bit of the parallel data, in synchronization with the synchronous signal; and
   an output circuit which transmits the training pattern and the parallel data bit by bit to the receiver, in which a receiver synchronous signal is generated using the reference signal, a memory position of a data buffer circuit is initialized when the training pattern is detected, an adjusted clock signal is generated for each bit of the parallel data by adjusting a phase of a first clock signal using each one of one-bit data signals each consisting of a single bit of the parallel data, so that a setup time and a hold time are ensured for each one-bit data signal, each one-bit data signal is loaded into the data buffer circuit in accordance with the adjusted clock signal, to hold a predetermined number of data bits consecutive in time in the data buffer circuit, and data of plural bits stored in the data buffer circuit is selected in time sequence and read out as parallel data in accordance with a second clock signal.

18. A data receiver for receiving parallel data of plural bits transmitted from a transmitter, the data receiver comprising:
   a synchronous signal generating circuit which generates a receiver synchronous signal using a reference signal;
   a pattern detecting circuit which detects a training pattern transmitted in synchronization with a transmitter synchronous signal generated using the reference signal in the transmitter;
   a clock adjusting circuit which generates an adjusted clock signal for each bit of the parallel data by adjusting a phase of a first clock signal using each one of one-bit data signals each consisting of a single bit of the parallel data, so that a setup time and a hold time are ensured for the each one-bit data signal;
   a data buffer circuit which loads each one-bit data signal in accordance with the adjusted clock signal, and holds a predetermined number of data bits consecutive in time, and whose memory position is initialized when the training pattern is detected; and
   a read circuit which selects data of plural bits stored in the data buffer circuit in time sequence and reads out the selected data as parallel data, in accordance with a second clock signal and in synchronization with the receiver synchronous signal.

* * * * *

UNITED STATES PATENT AND TRADEMARK OFFICE
CERTIFICATE OF CORRECTION

PATENT NO. : 7,460,630 B2
APPLICATION NO. : 11/057146
DATED : December 2, 2008
INVENTOR(S) : Shinya Kato et al.

It is certified that error appears in the above-identified patent and that said Letters Patent is hereby corrected as shown below:

Column 15, Line 12, change "file" to --the--.

Signed and Sealed this

Twenty-fourth Day of February, 2009

JOHN DOLL
*Acting Director of the United States Patent and Trademark Office*